(12) United States Patent
Albrecht et al.

(10) Patent No.: US 11,249,100 B2
(45) Date of Patent: Feb. 15, 2022

(54) MODULAR ROBOTIC SYSTEMS FOR DELIVERING FLUID TO MICROFLUIDIC DEVICES

(71) Applicant: Worcester Polytechnic Institute, Worcester, MA (US)

(72) Inventors: Dirk Albrecht, Worcester, MA (US); Ross Lagoy, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 19 days.

(21) Appl. No.: 16/240,720

(22) Filed: Jan. 5, 2019

(65) Prior Publication Data
US 2019/0212355 A1    Jul. 11, 2019

Related U.S. Application Data

(60) Provisional application No. 62/613,951, filed on Jan. 5, 2018.

(51) Int. Cl.
*B01L 3/00* (2006.01)
*G01N 35/10* (2006.01)
*B01L 3/02* (2006.01)

(52) U.S. Cl.
CPC ........ *G01N 35/1072* (2013.01); *B01L 3/0293* (2013.01); *B01L 3/502715* (2013.01); *B01L 3/502738* (2013.01); *G01N 35/1011* (2013.01); *G01N 35/1016* (2013.01); *G01N 35/1095* (2013.01); *G01N 35/1097* (2013.01); *B01L 2200/027* (2013.01); *B01L 2200/0615* (2013.01); *B01L 2200/146* (2013.01); *B01L 2300/0816* (2013.01); *B01L 2300/0829* (2013.01); *G01N 35/109* (2013.01)

(58) Field of Classification Search
CPC .......... G01N 35/1072; G01N 35/1065; G01N 35/10; B01L 3/0293; B01L 3/0289; B01L 3/02; B01L 3/502715; B01L 3/5027; B01L 3/502; B01L 3/50
USPC .................................. 422/503, 500, 50, 803
See application file for complete search history.

(56) References Cited

U.S. PATENT DOCUMENTS 6,322,683 B1 * 11/2001 Wolk ................ B01L 3/502707
                                                     204/600
7,494,817 B2    2/2009 Hodge
7,843,311 B2   11/2010 Willems et al.
(Continued)

FOREIGN PATENT DOCUMENTS

WO         2008024319 A2    2/2008

OTHER PUBLICATIONS

International Search Report in International Application No. PCT/US2019/012439 dated Mar. 5, 2019.

*Primary Examiner* — Christine T Mui
(74) *Attorney, Agent, or Firm* — Greenberg Traurig, LLP; Roman Fayerberg

(57) ABSTRACT

Systems and methods for delivering fluid to a microfluidic device is provided. The system includes a multi-well plate having a plurality of wells and an inlet tube having a first end being in communication with the one or more wells of the multi-well plate and a second end being in communication with a microfluidic device. The first end of the inlet tube is moveable between the plurality of wells of the multi-well plate to deliver fluid to the microfluidic device from the plurality of wells of the multi-well plate.

18 Claims, 28 Drawing Sheets

(56) References Cited

U.S. PATENT DOCUMENTS

| | | | |
|---|---|---|---|
| 8,492,165 B2* | 7/2013 | Van Pelt | B01L 3/502715 |
| | | | 436/180 |
| 2001/0049148 A1* | 12/2001 | Wolk | B01L 3/50273 |
| | | | 436/180 |
| 2005/0027712 A1 | 2/2005 | Gargi et al. | |
| 2016/0023862 A1 | 1/2016 | Reinisch | |
| 2016/0298173 A1* | 10/2016 | Wang | C12Q 2563/107 |
| 2017/0011431 A1 | 1/2017 | Thamert et al. | |
| 2017/0021371 A1 | 1/2017 | Kaneko et al. | |

\* cited by examiner

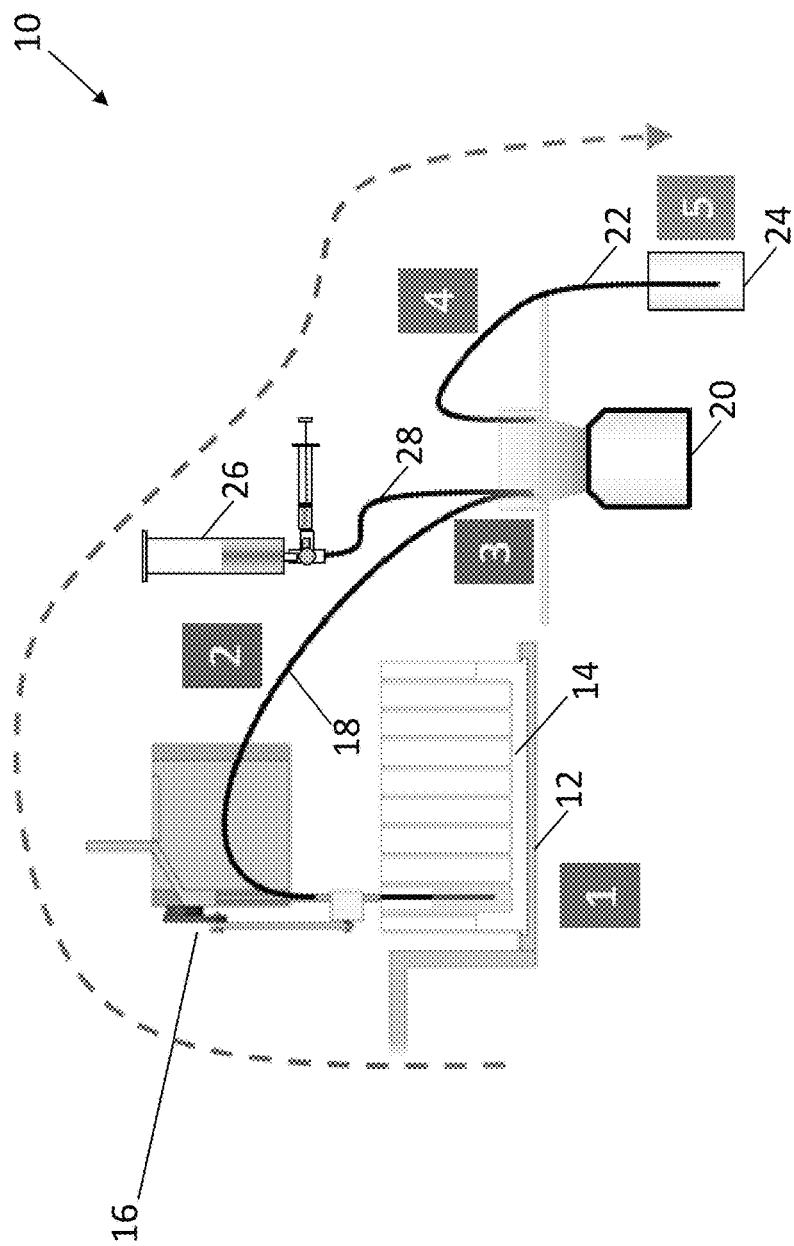
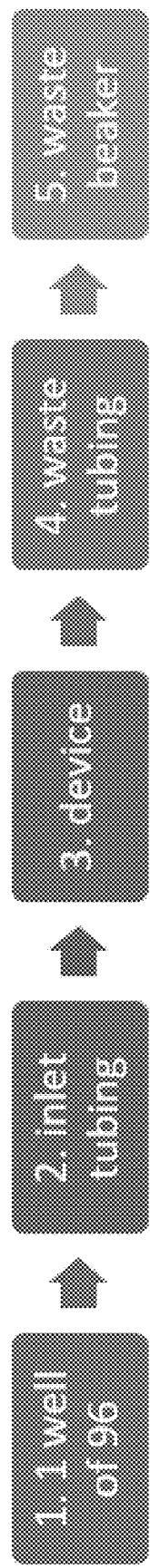
FIG. 1A
FIG. 1B

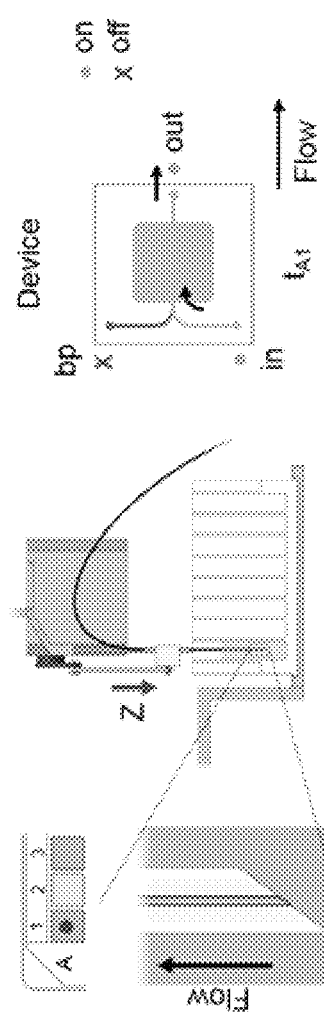
FIG. 3A
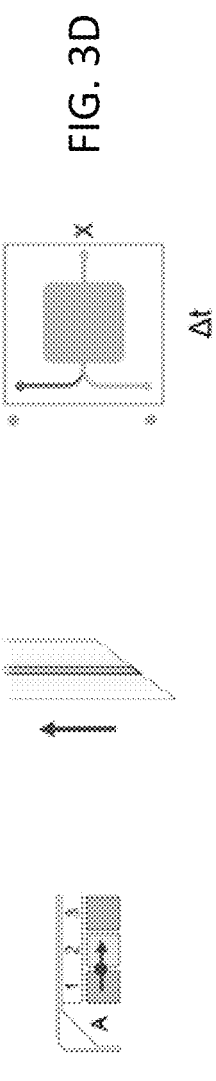
FIG. 3B
FIG. 3C
FIG. 3D
FIG. 3E
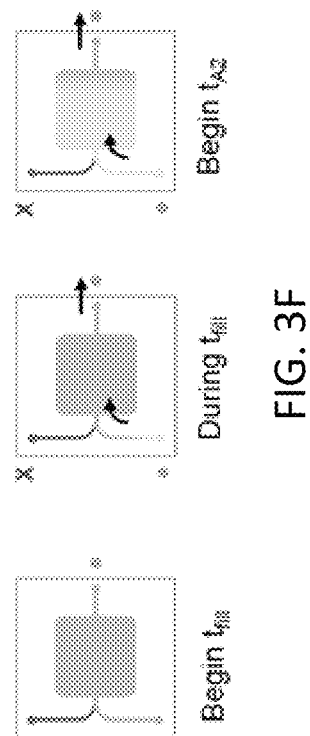
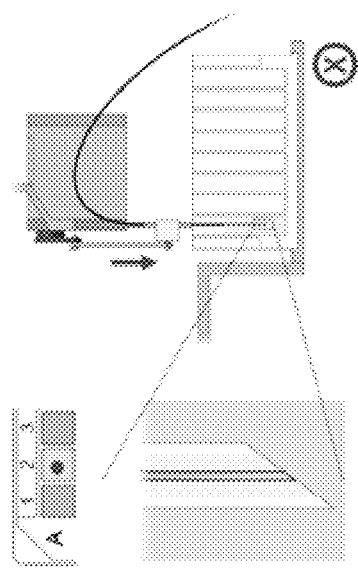
FIG. 3F

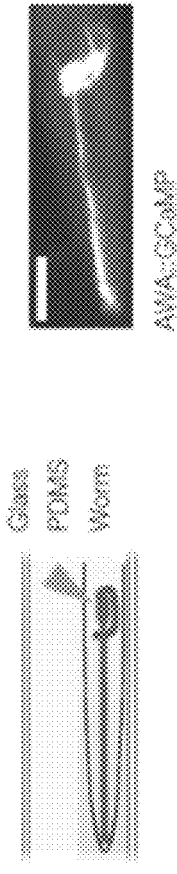
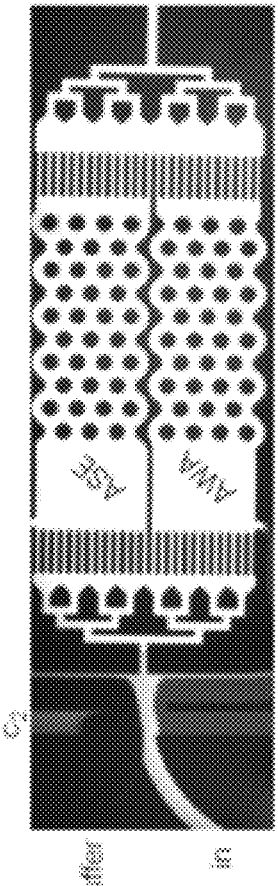
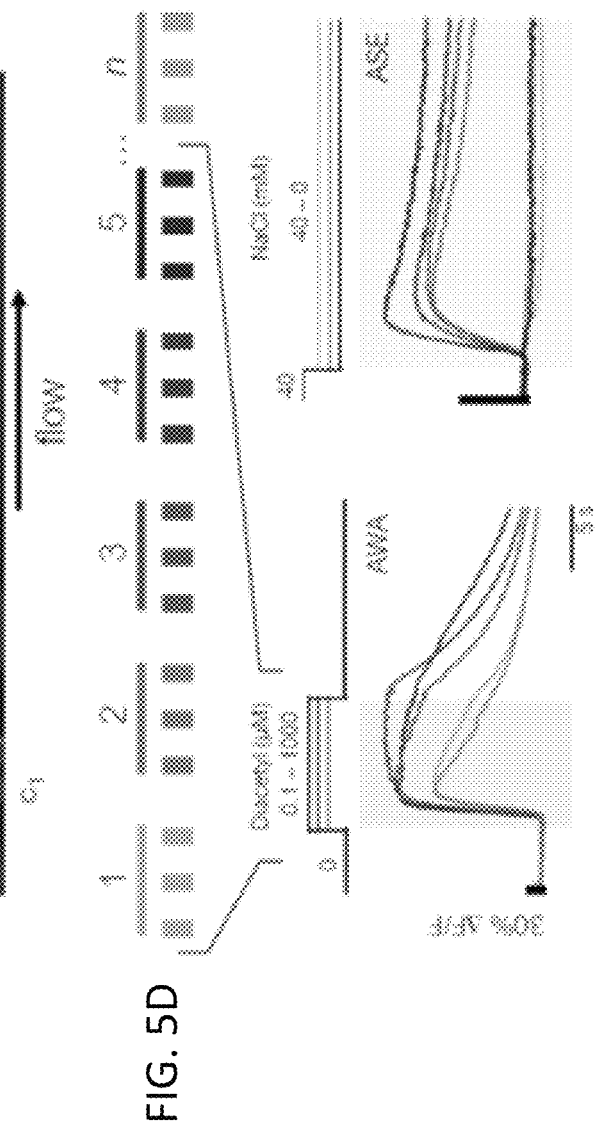
FIG. 5A  FIG. 5B  FIG. 5C  FIG. 5D  FIG. 5E  FIG. 5F

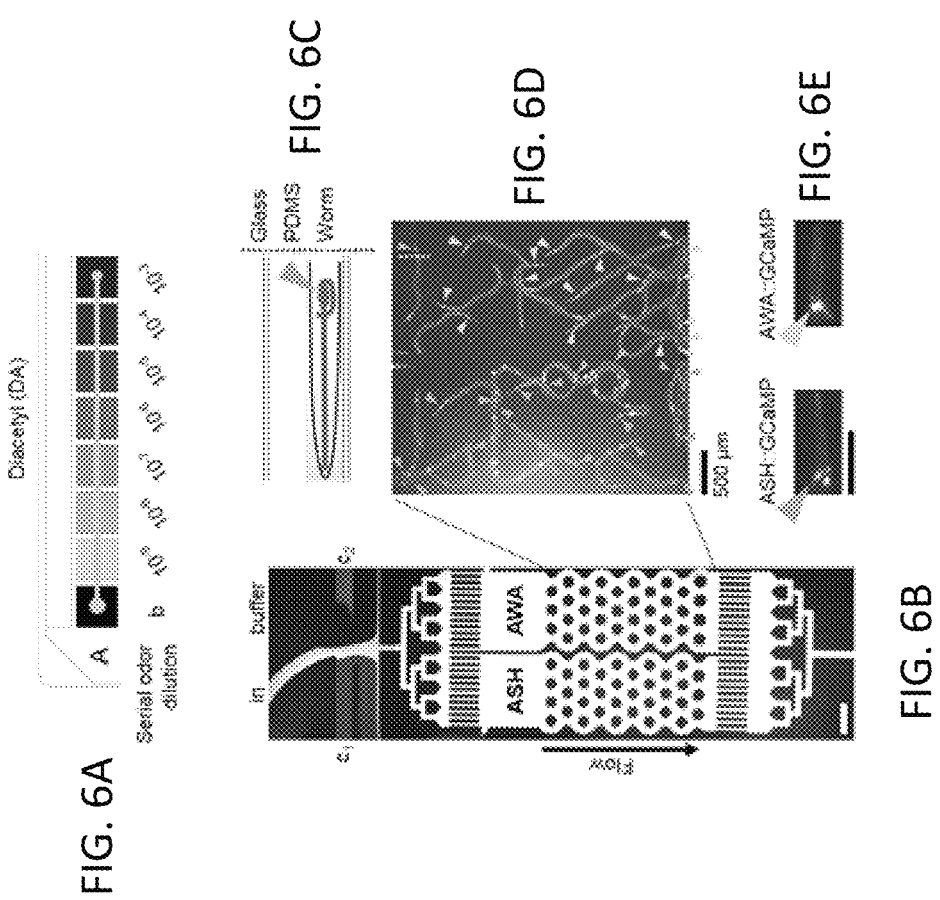

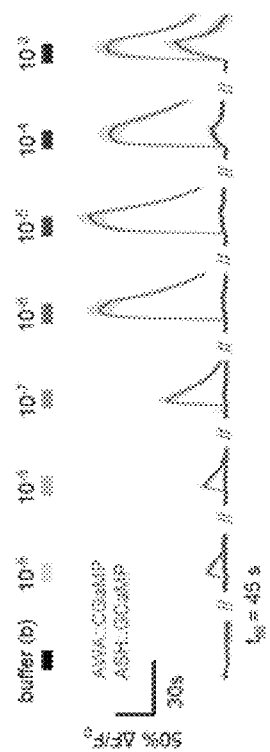
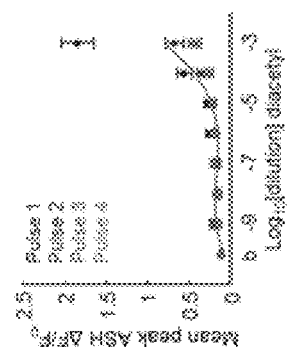
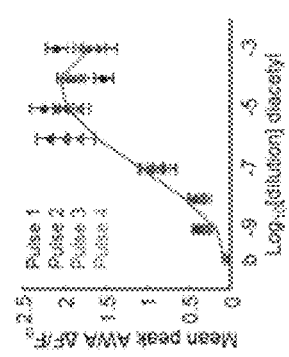
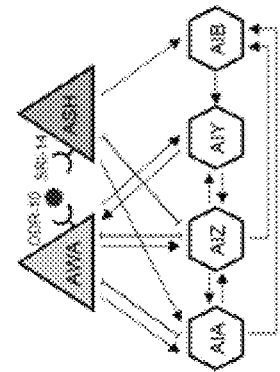
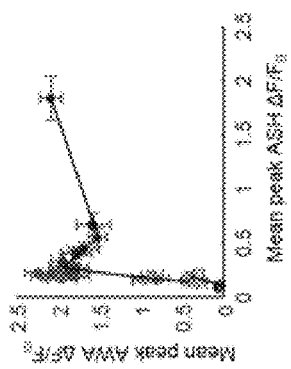

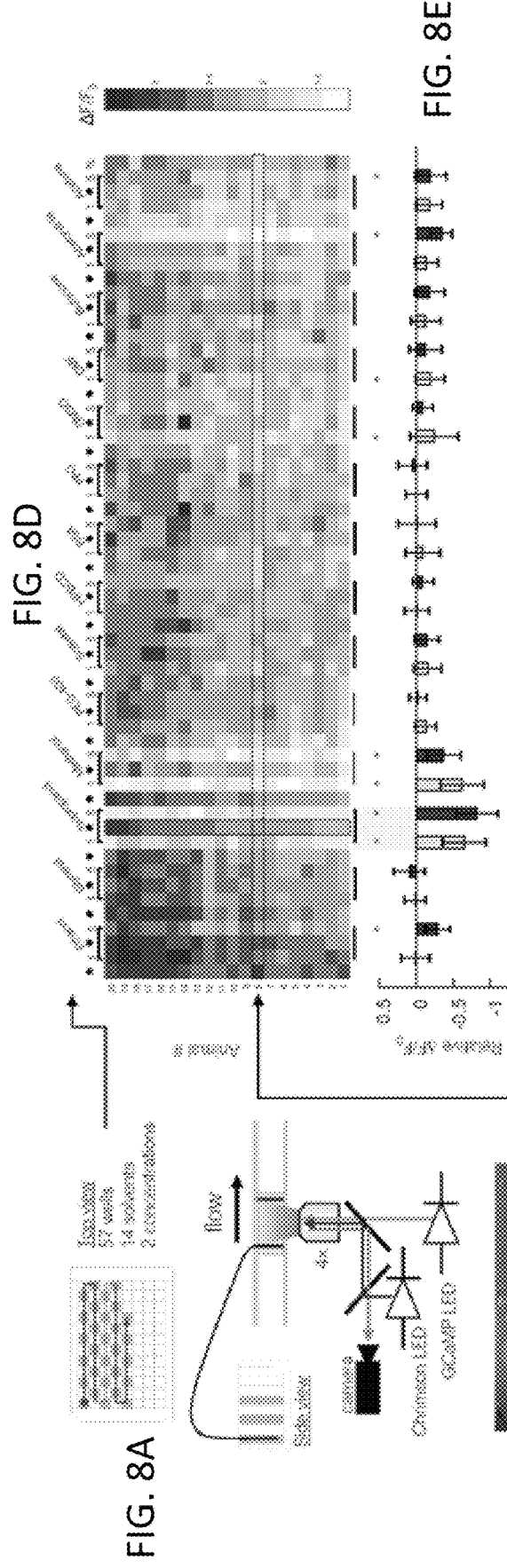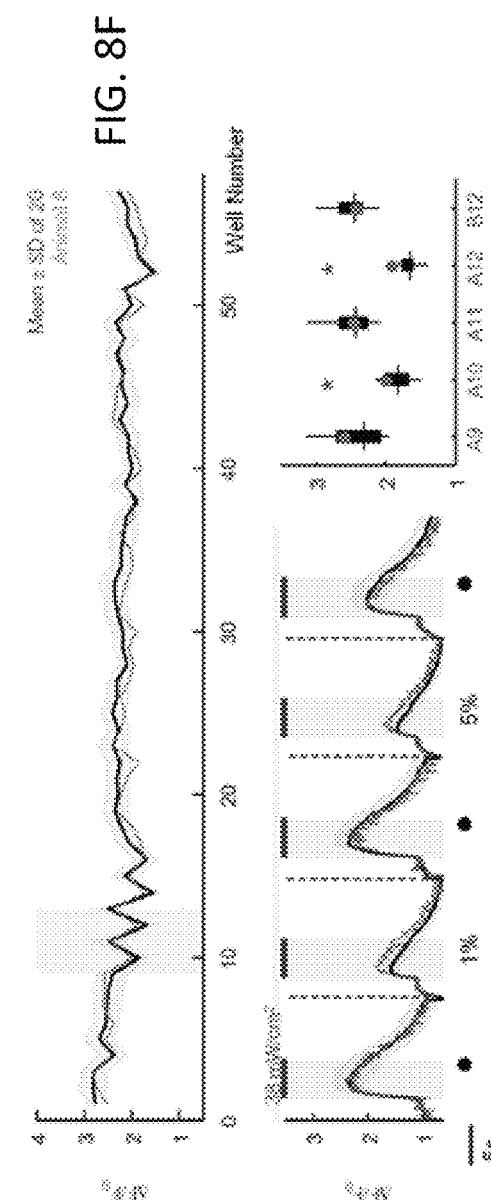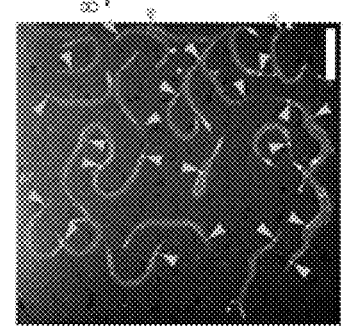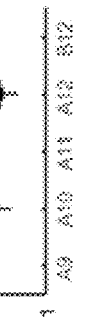
FIG. 8A FIG. 8B FIG. 8C FIG. 8D FIG. 8E FIG. 8F FIG. 8G FIG. 8H

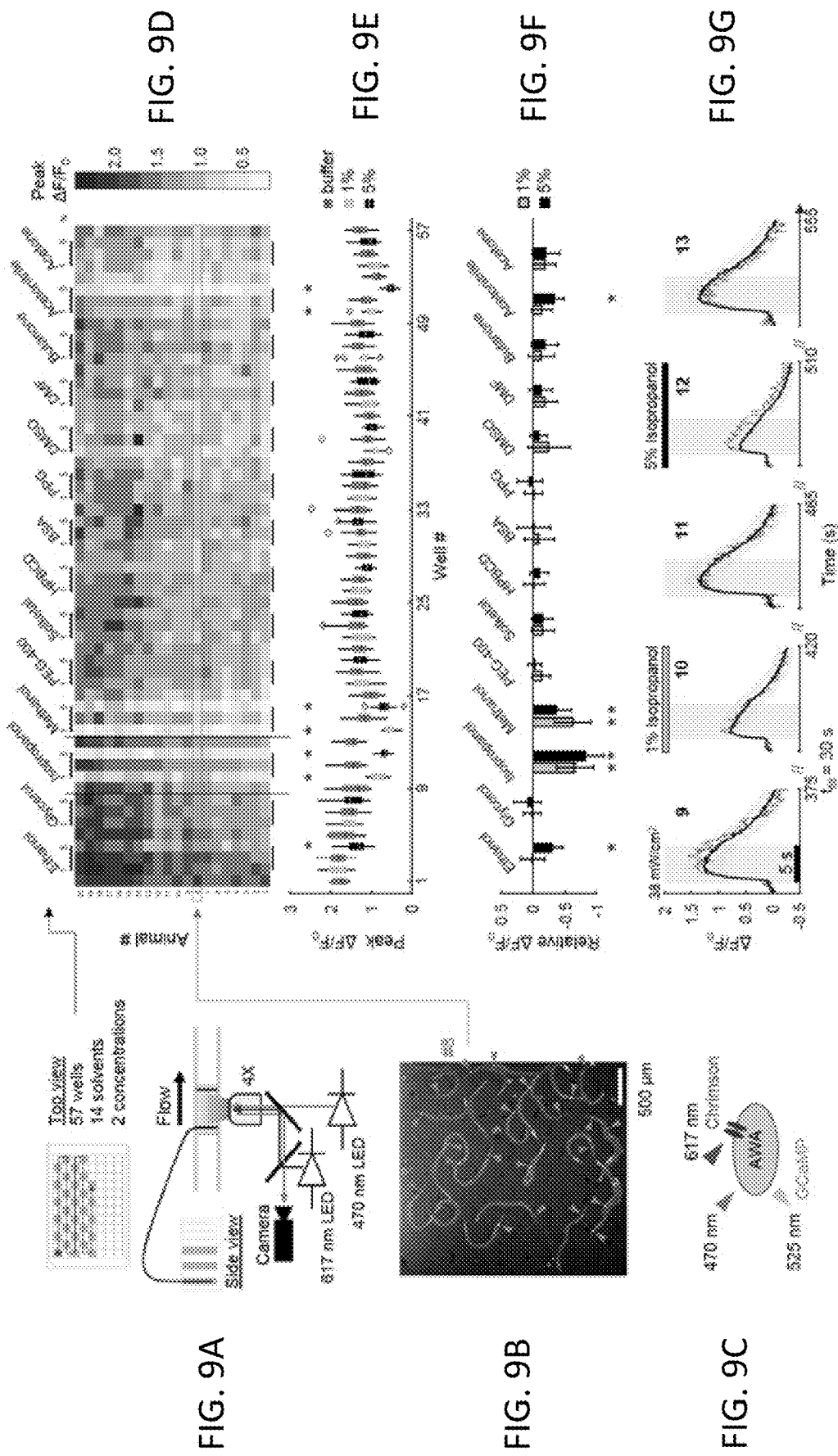

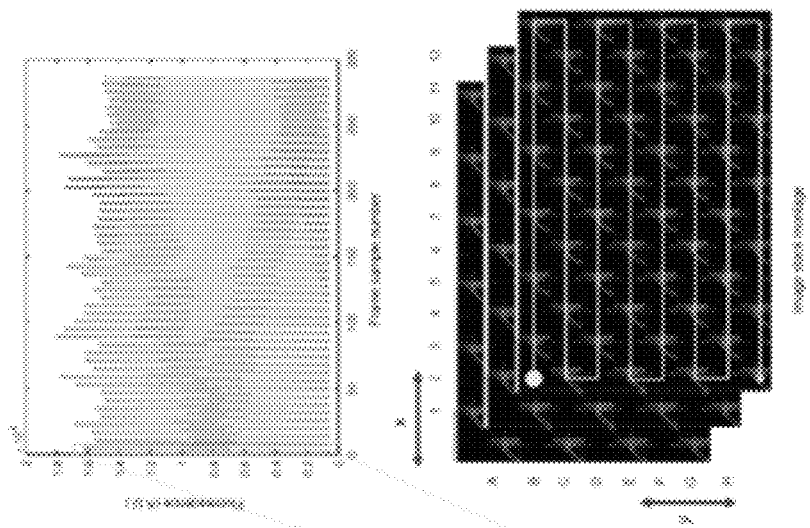
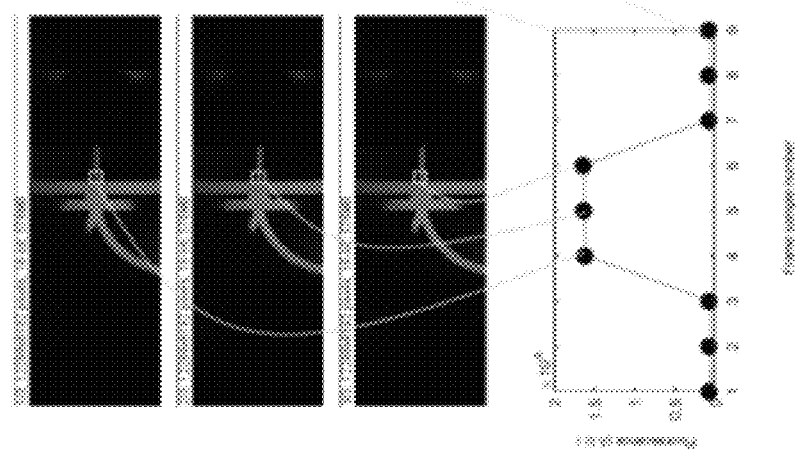
FIG. 12A  FIG. 12B  FIG. 12C  FIG. 12D

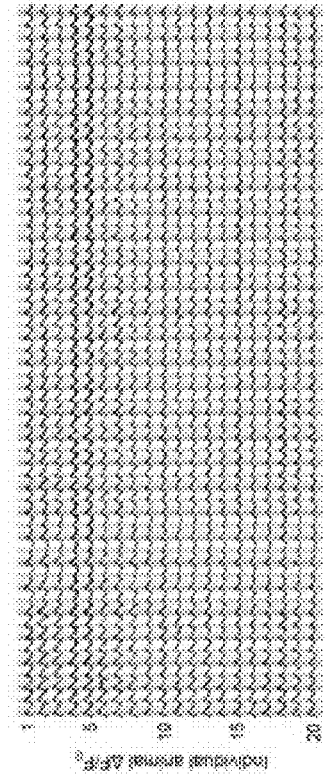
FIG. 14A
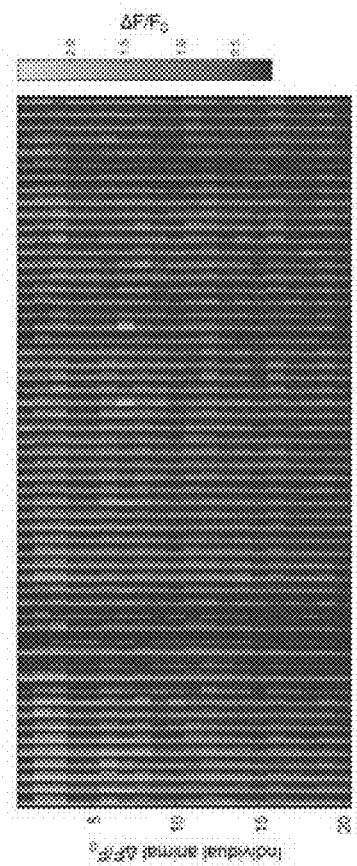
FIG. 14B
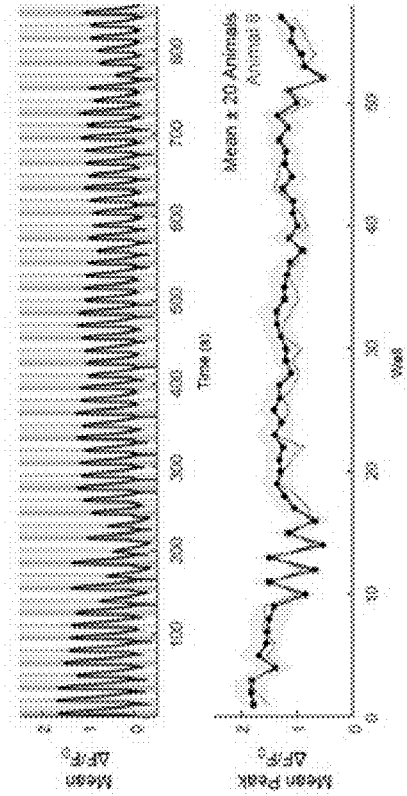
FIG. 14C
FIG. 14D

MODULAR ROBOTIC SYSTEMS FOR DELIVERING FLUID TO MICROFLUIDIC DEVICES

RELATED APPLICATIONS

This application claims the benefit of and priority to U.S. Provisional Application No. 62/613,951, filed Jan. 5, 2018, which is hereby incorporated herein by reference in its entirety.

STATEMENT OF GOVERNMENT SUPPORT

This invention was made with Government Support under Grant Number CBET 1605679 awarded by the National Science Foundation. The Government has certain rights in the invention.

FIELD

The disclosure relates generally to systems, methods and devices for fluid delivery to microfluidic devices for automated experiments.

BACKGROUND

Liquid-handling robots transfer liquid from reservoirs to multi-well plates, multi-well plates to multi-well plates, or from multi-well plates to assay substrates, typically using numerous pipette tips during each procedure. Current liquid-handling systems only enable liquid transfer to a microfluidic device using robot-compatible wells (limiting flow control and microfluidic designs) or by connecting numerous individual tubes into each well and microfluidic inlet(s) (increasing device cost and complexity).

Current liquid-handling robots and other liquid-transfer systems for microfluidic devices suffer from a number of shortcomings, such as, use of multiple components or an indirect interface that may complicate their operation. Accordingly, there is still a need for systems, methods, and devices that provide an efficient and inexpensive alternative for transferring many liquids housed in multi-well plates to microfluidic devices.

SUMMARY

A system is provided for delivering fluid to a microfluidic device that includes a multi-well plate having a plurality of wells, and an inlet tube having a first end being configured to deliver fluid from one of the plurality of wells of the multi-well plate and a second end being configured to deliver fluid to a microfluidic device. The first end of the inlet tube can be moveable between the plurality of wells of the multi-well plate to deliver fluid to the microfluidic device from the plurality of wells of the multi-well plate.

In some embodiment, the system can include a backpressure mechanism configured to prevent formation of bubbles in the inlet tube. The backpressure mechanism can include a reservoir of liquid coupled to a backpressure tube. The backpressure tube can have a first end being in communication with the reservoir and a second end being in communication with the microfluidic device.

In some embodiments, the inlet tube is coupled to a linkage arm movable in x, y, and z directions to allow for movement of the inlet tube between the plurality of wells of the multi-well plate. In some embodiments, the plurality of wells can include at least one of living biological samples and non-living biological samples. In some embodiments, fluid from the microfluidic device is configured to be delivered to at least one of a devices tube, and subsequent multi-well plates during or after automated experimentation.

In some embodiments, the microfluid device is in the form of several microfluidic devices in series. In some embodiments, the microfluid device is in the form of several microfluidic devices in parallel.

In some embodiments, at least one well of the plurality of wells in the multi-well plate is configured to be a buffer well such that the buffer well includes a fluid for cleaning the inlet tube before the inlet tube is moved to a subsequent well in the multi-well plate.

A system is provided for delivering fluid to a microfluidic device that includes a robotic multi-well plate holder holding a multi-well plate comprising a plurality of wells, and an inlet tube having a first end and a second end. A microcontroller can operably engage the robotic multi-well plate holder and the inlet tube so as to enable movement of the first end of the inlet tube between the plurality of wells of the multi-well plate. The second end of the inlet tube is configured to deliver fluid to a microfluidic device from the plurality of wells of the multi-well plate.

In some embodiment, the system also includes a servo linkage operably engaging the first end of the inlet tube to fluid connect the first end of the inlet tube to plurality of wells of the multi-well plate. In some embodiments, the plurality of wells can include at least one of living biological samples and non-living biological samples. In some embodiments, the system can include a backpressure mechanism configured to prevent formation of bubbles in the inlet tube. The backpressure mechanism can include a reservoir of liquid coupled to a backpressure tube, the backpressure tube having a first end being in communication with the reservoir and a second end being in communication with the microfluidic device. In some embodiments, at least one well of the plurality of wells in the multi-well plate is configured to be a buffer well such that the buffer well includes a fluid for cleaning the inlet tube before the inlet tube is moved to a subsequent well in the multi-well plate.

A method is provided for delivering fluid to a microfluidic device that includes positioning a first end of an inlet tube in a first well of a multi-well plate. The first well includes a first composition. The method further includes connecting a second end of the inlet tube to a microfluidic device to add the first composition to the microfluidic device, and moving the first end of the inlet tube to a second well of the multi-well plate to add a second composition from the second well to the microfluidic device.

In some embodiments, the method further includes applying a backpressure to the inlet tube to prevent formation of bubbles in the inlet tube as the inlet tube moves from the first well to the second well. The backpressure can be applied using backpressure tube that is in fluid communication with a liquid reservoir and the inlet tube. In some embodiments, the method includes applying a contamination protocol to prevent contamination between the first and second composition as the inlet tube moves from the first well to the second well. The contamination protocol can include moving the first end of the inlet tube to a buffer well in the multi-well plate before the inlet tube is moved to the second well to clean the inlet tube of the first composition.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1A illustrates an exemplary embodiment of a robotic delivery system;

FIG. 1B is an exemplary flow-diagram showing balanced liquid transfer from multi-well plate to tubing, to microfluidic device, to outlet tubing, to waste;

FIG. 3A-FIG. 3F show liquid balance and filling;

FIG. 5A-FIG. 5F show automated dose response measurements in chemosensory neurons of young adult *C. elegans*;

FIG. 6A-FIG. 6J illustrate additional automated dose response measurements in chemosensory neurons of young adult *C. elegans*;

FIG. 8A-FIG. 8H show an automated *C. elegans* solvent screen yields suppressors of neural responses to optogenetic activation;

FIG. 9A-FIG. 9G show an automated *C. elegans* solvent screen that yields suppressors of optogenetically-activated neural responses as in FIG. 8;

FIG. 12A-FIG. 12D show the carryover calculation;

FIG. 14A-FIG. 14D illustrate calcium responses to optogenetic activation pulses in different buffers, solvents, and carriers as in FIG. 13 and from FIG. 8 and FIG. 9;

Figure 1C:
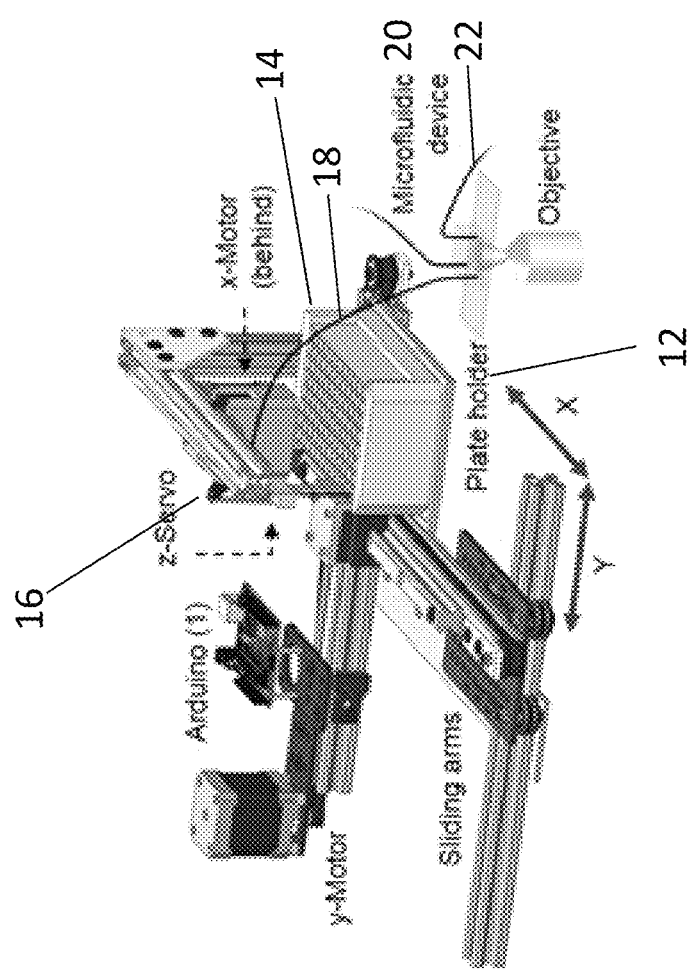
FIG. 1C illustrates an exemplary embodiment of a robotic delivery system.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments.

Specific details are given in the following description to provide a thorough understanding of the embodiments. However, it will be understood by one of ordinary skill in the art that the embodiments may be practiced without these specific details. For example, systems, processes, and other elements in the presently disclosed embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Subject matter will now be described more fully with reference to the accompanying drawings, which form a part hereof, and which show, by way of illustration, specific example aspects and embodiments of the present disclosure. Subject matter may, however, be embodied in a variety of different forms and, therefore, covered or claimed subject matter is intended to be construed as not being limited to any example embodiments set forth herein; example embodiments are provided merely to be illustrative. The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure relates to systems and methods for delivering fluid to a microfluidic device. Microfluidic devices offer several advantages for biomedical research, particularly for presenting precise physical and chemical environments to cells and organisms, multiplexing experimental conditions, and reducing reagent volumes for screening applications. However, challenges to their widespread adoption include increased complexity over conventional manual methods, high up-front costs, and operational challenges (such as clogging, leaks, or bubbles due to improper setup or filtering). Particularly for screening applications, the interfacing of chemical libraries (typically in multi-well plate formats) with microfluidic devices remains a technical challenge. Current approaches to deliver fluids from multi-well plates to microfluidic networks include complex setups that contain numerous separate inlet tubes, one per inlet well (i.e. 96 inlet tubes from a 96-well plate), or microfluidics integrated into plastic multi-well dishes (e.g. ibidi, CellA-SIC, etc.) that can be used with conventional liquid-handling robots. These approaches have expensive, often single-use cartridges operated by dedicated flow control equipment. In all systems, experimental setups aim to establish a bubble-free fluidic network prior to experimentation because air bubbles can disrupt fluid flow and any disconnection of tubing tends to introduce them. Also, in-line debubblers are not ideal in some systems because they occupy relatively large fluidic volumes; meanwhile, rotational valves can change inlet streams without disconnecting tubing, but are limited to 8- or 12-positions, and both can be expensive and difficult to clean.

Disclosed herein is a system that allows a microfluidic inlet tube to be automatically transferred from one reservoir to another, such as from one well of a multi-well plate to another well, without introducing a bubble and with negligible well-to-well liquid carryover. In this manner, a virtually unlimited number of liquids can be delivered sequentially into a microfluidic device while controlling or removing cross contamination. This system can be implemented using inexpensive open-source hardware and software for automation and data collection, and may be used with more robust commercial equipment. This system can completely automate (1) the optimization of chemical concentrations for neural step-response experiments, (2) complex functional screens such as determining the effect of solvents or drugs on optogenetically-activated neural responses in living nematodes, and (3) multi-step and multi-duration protocols, like cell staining. In each example, multi-well plates are first filled with the desired liquids, then the liquid exposure time-course corresponding with inlet tubing positions and image acquisition is defined in custom user-friendly software, and the assay targets are prepared (e.g. organisms or cells). All subsequent experimental activity requires no user intervention. This versatile tool is capable of expanding the throughput of liquid handling and biological experiments requiring serial delivery of multiple fluids, from neuronal imaging in living organisms to immunohistochemical staining, and improving results by making protocol optimization and data collection more efficient.

The system automatically and serially transfers liquids from different wells to the integrated microfluidic device, and also automates a cell-staining protocol (FIGS. 4A-4H and FIGS. 11A-11G). The system can be used in any microfluidic applications, including automating cell staining protocols, small molecule drug screening and others.

In some embodiments, an automated robotic system 10 as shown in FIG. 1A is configured to automatically transfer liquids serially from multi-well plates to a microfluidic device using an inlet tubing. Interfacing these platforms would enable new high-throughput experiments with precise fluidic control. The system integrates custom software (i.e. Arduino®, ImageJ MicroManager, and MATLAB™), custom mechanical design components (i.e. a servo linkage and a plate holder), and a unique concept of microfluidic control and interface that avoids the introduction of bubbles at the inlet tubing during well-to-well transfer (FIG. 1A, FIGS. 4A-4H, FIGS. 15A-15E, and FIGS. 16A-16B). The robotic system allows for 10's to 100's of different liquid inputs before requiring manual transfer of multi-well plates, and demonstrates a plug-and-play design for various liquid transfer protocols to microfluidic devices.

Figure 15A:
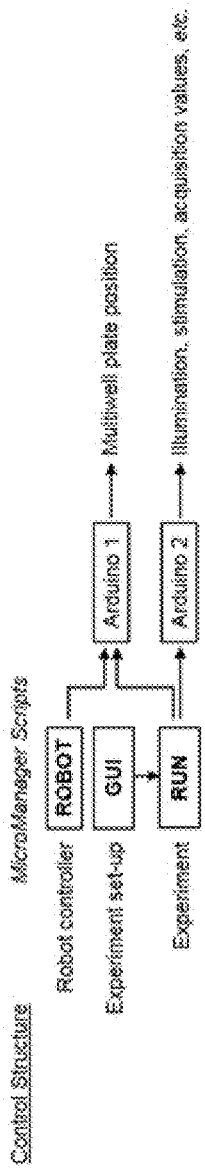
FIG. 15A-FIG. 15E show various embodiments of GUIs.
Figure 15B:
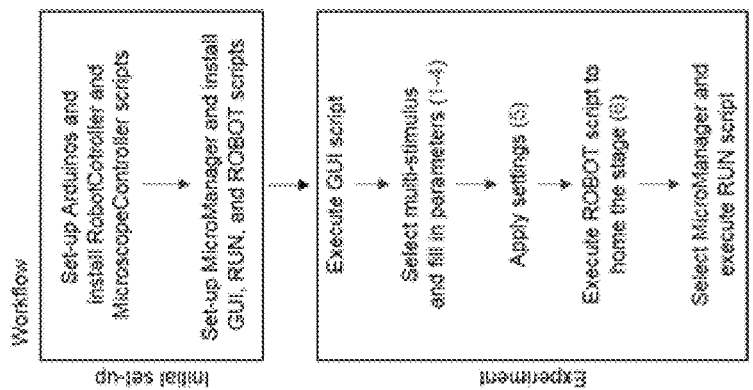
Figure 15C:
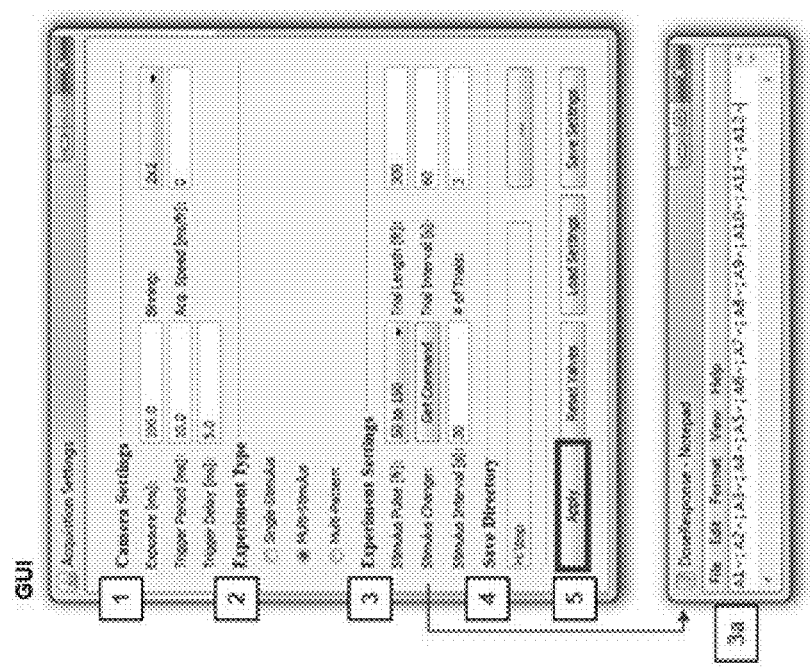
Figure 15D:
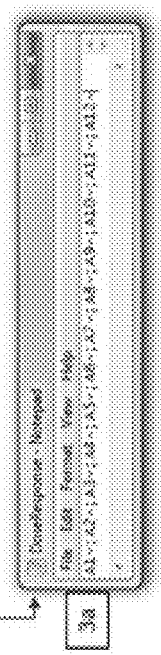
Figure 15E:
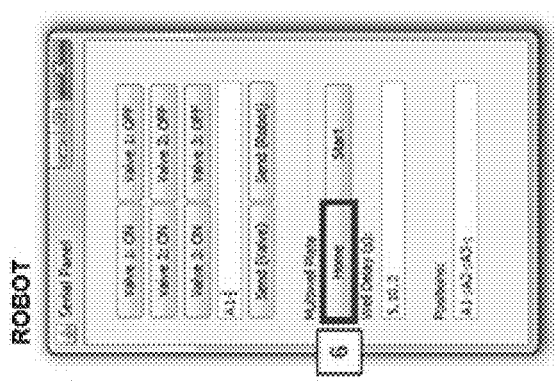

FIGS. 15A-15E illustrates various software control structures and graphical user interfaces (GUIs) developed to enable input of experimental settings and automation of the robotic system. FIG. 15A illustrates an exemplary flow diagram of GUI, RUN, and ROBOT control scripts developed in Micro-Manager™ for independent robot automation via Arduino® 1 and for control of stimulation, valves and image capture via Arduino® 2. FIG. 15B illustrates a flow diagram of initial set-up (upper box), and experiment execution steps (lower box). Numbers correspond to selections in the user interface shown in FIGS. 15C-15E. FIG. 15C is an exemplary screen shot of the Acquisition Settings GUI that allows user input for Camera Settings: (1) Exposure, (2) Trigger Period, and (3) Trigger Delay. The Experiment Type Multi-Stimulus corresponds to robotic experiments with the same timing and pulse pattern per well, as defined in Experiment Settings. Stimulus Pulse is used to set the state [on/off] of one stimulation valve used for microfluidic pulse experiments. Stimulus Interval sets the fill delay (tfill), or time to wait until the next stimulus has completely filled the inlet tubing. Trial Length allows the user to specify how long to record the video in frame count. TrialInterval corresponds to the time between repeated trials. The #of Trials defines the number of repeated trials per well. (4) Save Directory indicates where imaging data is stored. (5) Settings are saved and finalized by clicking Apply. FIG. 15D is a sample text file with well plate and servo positions for the Stimulus Change option for all wells in the first row, from FIG. 15C. FIG. 15E illustrates another exemplary GUI called ROBOT for independent control of position, timing, and valve state [on/off]. The first box allows the user to manually enter the single well position for the robot to move to, as well as the servo arm position once it reaches that well. The robot can be 'homed' to A1 (below). A comma separated list of well duration times (in seconds) can be entered to the WellDelay box, each corresponding to a semicolon separated string of multi-well plate positions and servo states in the Positions text box, with a syntax described in Methods. TIFF stacks are acquired by applied camera settings using GUI and saved per set well position and timing after clicking Start.

Figures 16A, 16B:
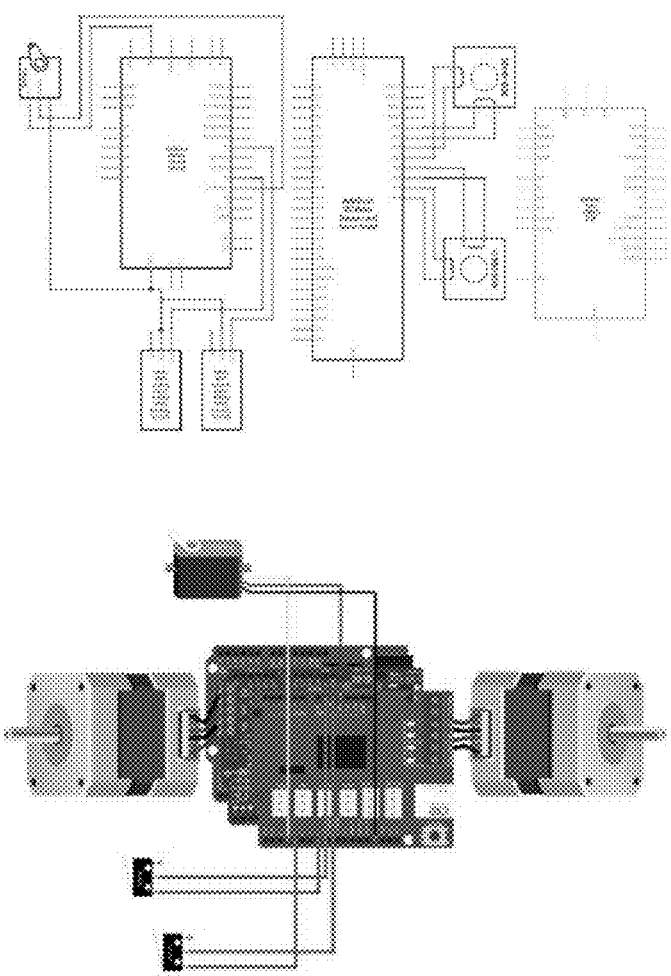
FIG. 16A-FIG. 16B show the Arduino® control for robot.
Figure 17C:
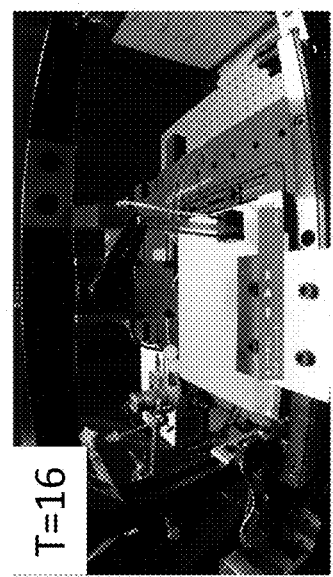
FIG. 17A-FIG. 17F show six different and sequential screen shot time points (in seconds) of the actual robotic system moving through a complete 96 well plate time series.
Figure 17F:
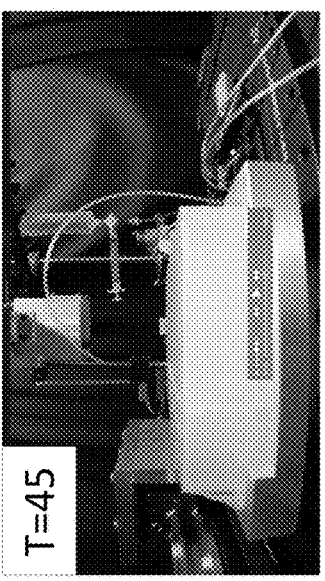
Figure 17B:
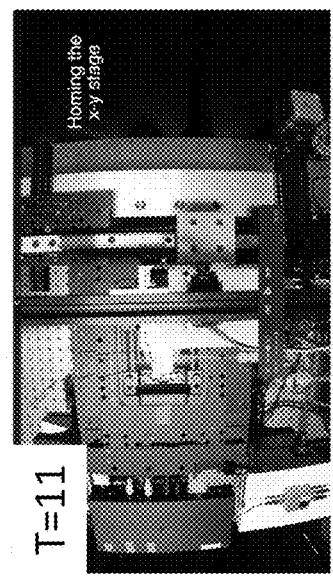
Figure 17E:
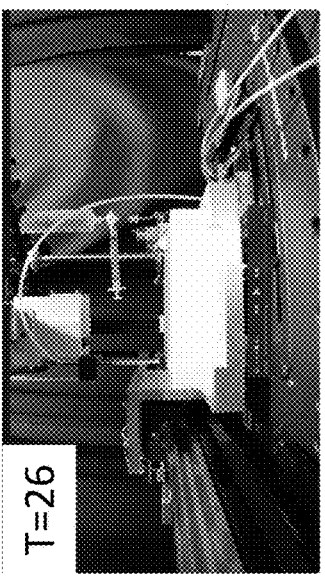
Figure 17A:
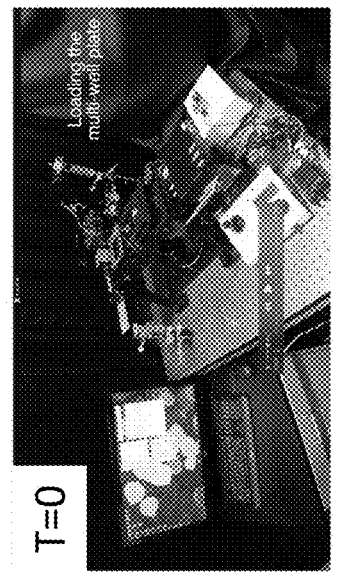
Figure 17D:
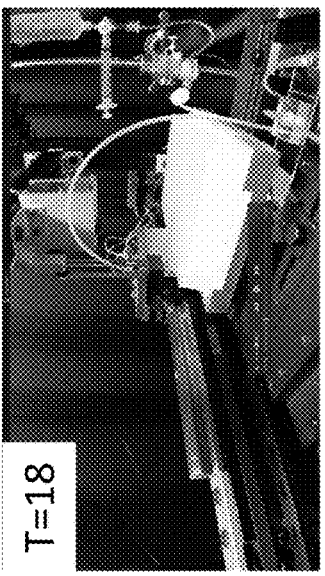

In some embodiments, a microcontroller (i.e. Arduino® Uno) (as shown in FIGS. 16A-16B) and motor shield receive user input from a graphical user interface (GUI) to specify the desired x,y-axis of the multi-well plate position, z-axis inlet tubing position, and all corresponding durations (FIGS. 15A-15E). This enables the user to prepare unique and customized patterns for liquid delivery from a series of wells in the multi-well plate to an integrated microfluidic system. The entire robotic system is modular, meaning that it can be easily transported, programmed, and integrated into new or pre-existing microfluidic systems to execute as a stand-alone device with MATLAB™, Arduino®, or ImageJ MicroManager, for various automated and microscopy experiments.

In some embodiments, for example shown in FIG. 1A, the system 10 can include a multi-well plate holder 12 configured to support a multi-well plate 14. A robotic mechanism including a servo linkage 16 is configured to move relative to the multi-well plate 14 such that fluid in the plurality of wells in the multi-well plate 14 can be delivered to a microfluidic device 20 using an inlet tube 18. The inlet tube 18 can include a first end that is in communication with the wells of the multi-well plate 14 as the inlet tube 18 is moved between the wells using the robotic mechanism, and a second end that is in communication with the microfluidic device 20. In some embodiments, the system can include an outlet tube 22 that includes a first end that is in communication with the microfluidic device 20 and a second end that is in communication with a waste reservoir 24. In some embodiments, as will be explained in more detail below, the system 10 can include backpressure mechanism configured to prevent the formation of bubbles in the inlet tube 18 and contamination between liquid in the wells as the inlet tube 18 moves therebetween by maintaining a liquid-to-liquid interface at the first end of the inlet tube 18. For example, the backpressure mechanism can include reservoir 26 and a backpressure tube 28.

In some embodiments, the system includes two custom mechanical assemblies, a multi-well plate holder and a servo linkage mount. As shown in FIG. 1C, the multi-well plate holder 12 can allow for the mounting and support of a completely filled multi-well plate 14, for example a deep 96 well plate (2 mL/well), onto the linear bearing supported side rail, aligned in the x,y,z-axes with the servo linkage 16 and inlet tubing tip. The servo linkage 16 allows for the mounting of a servo onto a V-slot bar for repetitive placement of the inlet tube 18 into the specified wells by vertical motion along the z-axis, as shown in FIGS. 3A-3F. The servo bar height can be adjusted and aligned for shallower multi-well plates, and higher-content screening (i.e. 384 well plates). This servo design also provides sufficient force for the ridged inlet tubing tip (cut at ~45-degree angle) to reliably puncture a plastic sealing cover film applied over the multi-well plate, used to limit evaporation and exposure of volatile compounds to the laboratory environment. The system can also be adjusted for different plate configurations, such as 6 well to 384 well plates with shallow or deep wells for experiments that may require specific flow durations, higher-content liquid quantities, and/or volume delivery, as shown in FIG. 1C. These custom components can also be 3D printed. In some embodiments, the robotic system includes commercially available parts.

FIGS. 3A-3F illustrate various tube positions, valve states, and microfluidic flow before, during, and after a stimulus transition. As shown in FIGS. 3A-3B, before a stimulus transition, the servo arm can lower the tip of the inlet tube into liquid of well A1, shown as a dot in the top-view of the multi-well plate. A magnified view of the tubing tip shows a full tubing channel containing A1 well fluid. The outlet (out) valve state is 'on' and backpressure (bp) is 'off', allowing fluid to flow through the microfluidic device from well A1. As shown in FIGS. 3C-3D, during the transition of well plate position from A1 to A2, the tip of the inlet tube can be raised up by the servo arm. No air enters the tubing because the outlet valve is 'off', and the backpressure valve is turned 'on'. As shown in FIG. 3E-3F, the multi-well plate is then positioned to well A2, the tubing tip is lowered into the well, backpressure is turned 'off', and the outlet is rapidly turned 'on' to restore fluid flow. During the initial tfill state, only the prior well fluid (A1) flows through the microfluidic device, while the new fluid (A2) begins to fill at the inlet tip channel. A short time later, the current well fluid begins to fill the microfluidic inlet channel and device with the next solution. The required tfill time is inversely proportional to flowrate, about 30 s at 2 µL/s.

Figure 2B:
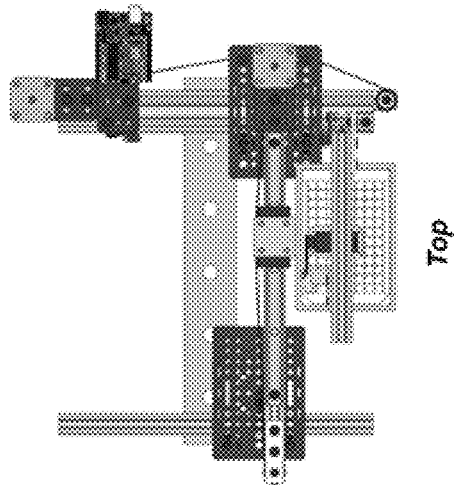
FIG. 2A-FIG. 2G illustrate multiple views of an embodiment of a robotic delivery system.
Figure 2C:
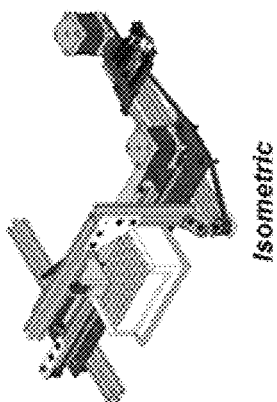
Figure 2A:
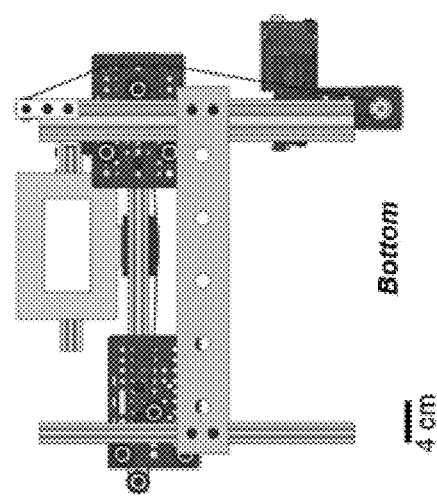
Figure 2F:
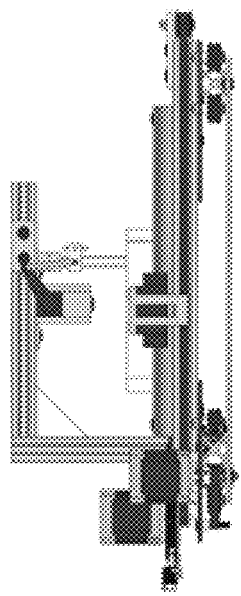
Figure 2G:
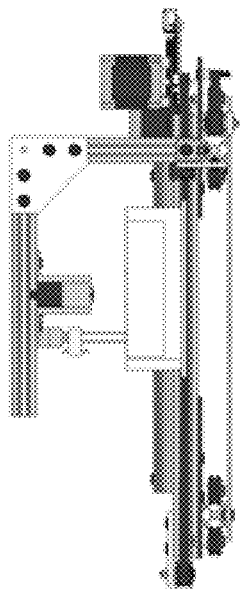
Figure 2D:
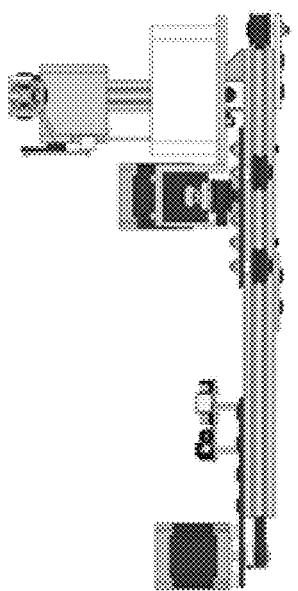
Figure 2E:
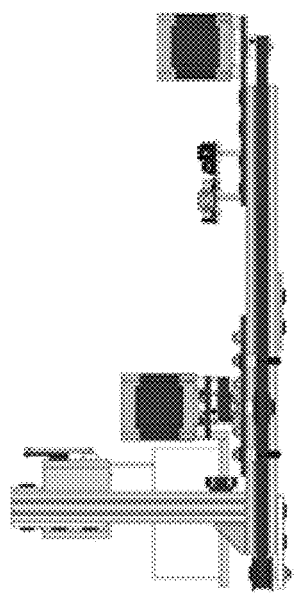

FIGS. 2A-2G illustrate multiple views of an embodiment of a modular robotic system design. FIG. 2A illustrates a bottom view of the robotic system showing versatility of microscope stage mounting with an aluminum bar of equally spaced, large diameter mounting holes. FIG. 2B illustrates a top view of the robotic system showing the range of x-y motion on the linear slide rail and v-slot rails. Both motors can be mounted vertically, with belts positioned through v-slot rails or fastened to the multi-well plate holder. Two v-slot universal plates are used to mount the linear slide rail with standard hardware. The servo linkage assembly is aligned with the A1 'home' position in the top left. An Arduino R3 Uno is mounted towards the back-right, protected by a limit switch. FIG. 2C illustrates an isometric view of the robotic system showing both x-y motors in front, and the servo linkage assembly mounting arm using cut v-slot rails and mounting hardware. FIG. 2D illustrates a left-side view of the robotic system showing the alignment of the multi-well plate and servo linkage assembly in the raised 'up' position (as show in all panels), with motors to the far side. The multi-well plate holder (orange) is elevated above the left v-slot rail, allowing for full x-range and removal of the multi-well plate. The multi-well plate is also connected to the x-range drive belt. FIG. 2E illustrates a right-side view of the robotic system showing the alignment of the y-range belt and front of the servo linkage assembly, similar to FIG. 2D. FIG. 2F illustrates a back-side view of the robotic system showing the servo linkage assembly aligned. The multi-well plate is elevated above the bottom aluminum bar to ensure sufficient spacing from all moving parts with various microscope stages and mounting platforms. FIG. 2G illustrates a front-side view of the robotic system showing the alignment and height of the servo linkage with the top of the multi-well plate. The height of the servo mount can be adjusted by a T-nut for use of various depth multi-well plates (for example, 2 mL depth).

Figures 4A, 4B:
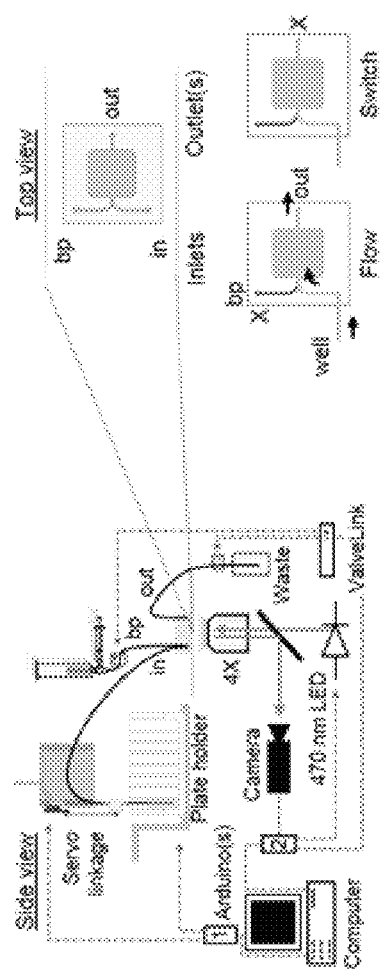
FIG. 4A-FIG. 4H show an overview of the robotic fluid delivery platform, control systems, switching dynamics, and carryover across wells of a multi-well plate.
Figure 4D:
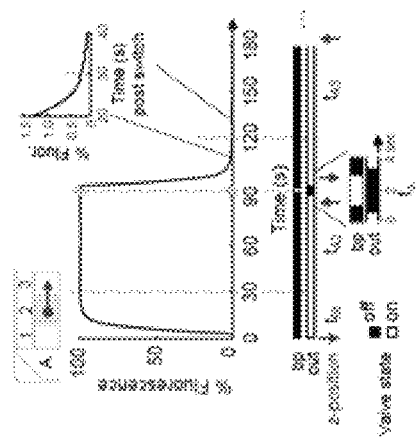
Figure 4C:
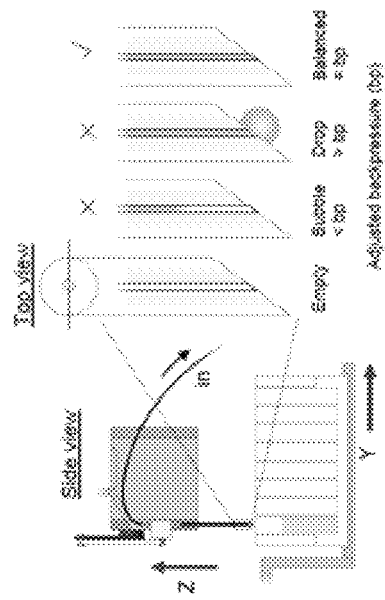

In some embodiments, the robotic platform/mechanism is configured to interface with a microfluidic device by a tubing inlet design. In its simplest arrangement, all tubing is plugged into the microfluidic device forming a connected liquid network; the "backpressure" (bp) tubing is attached to a liquid reservoir, while the second "inlet" (in) tubing leads to the multi-well plate, all of which lead to the waste (out) reservoir and are open to atmospheric pressure (FIG. 4A and FIG. 4B). As explained above, the backpressure design is used prevent bubbles while lifting and transferring the inlet tubing from one well to the next, and to prevent carryover caused by backflow of the prior inlet fluid to the next well, as shown in FIG. 4C. Thus, when the outlet tubing is closed with a valve, the inlet tubing can be moved to a new well without introducing a bubble or carryover provided by proper backpressure, as shown in the flow chart of FIG. 1B, and in FIGS. 3A-3F, and FIGS. 4A-4H. By positioning the height of the backpressure reservoir above the fluid surfaces contained within the multi-well plate, a balanced hydrostatic pressure difference between the backpressure reservoir and capillary pressure in the inlet tubing can be achieved, limiting carryover effect and introduction of bubbles (FIGS. 3A-3F and FIGS. 4A-4H). The system also functions with both reusable and permanently-bonded microfluidic devices.

In addition, the backpressure mechanism can be used to prevent or limit contamination between the liquid in the different wells on the multi-well plate. For example, contamination can be limited by minimizing liquid carryover from one well to another as the inlet tubing moves between wells on the multi-well plate. Other techniques can also be used to minimize fluid contamination. For example, one or more of the wells on the multi-well plate can be used as a buffer well that contains water, saline, or some other washing liquid as part of a washing protocol to clean the inlet tube. The percentage of liquid carryover between wells can vary depending on the contamination minimization methods that are employed, and the percentage of liquid carryover that is acceptable can depend on the type of liquid in the wells and the type of experiment being performed in the microfluidic device.

In the current system, liquid flow is driven by hydrostatic pressure and controlled by automatic actuation of liquid control valves, but may not be limited to this design. Therefore, in this design, the difference in heights between the atmospheric inlet and waste outlets determines the flow rate achieved in the system when the waste tubing valve is open (typically 2 µL/s). Other specific flow rates may be achieved by integrating devices like programmable syringe pumps or vacuum lines. In its simplest form, the microfluidic system contains at least two inlets flowing into the device and one outlet exiting it. Both inlet tubings are plugged into the microfluidic chip forming a connected liquid channel; one termed the "backpressure" tubing is attached to a liquid reservoir, while the second "input" tubing leads to the chemical reservoirs, such as a multi-well plate. By positioning the height of the backpressure reservoir slightly above the input tubing, it is possible to lift the input tubing out of a well without drawing in an air bubble and without backward flow of liquid out of this tube. Under these conditions, the hydrostatic pressure difference between the inlet tubings exactly balances capillary pressure in the tubing. The waste outlet tubing plugged into the microfluidic chip is connected to a waste reservoir open to atmosphere and positioned below the inlet reservoir. The difference in heights between the atmospheric inlet and waste outlets determines the flow rate across the samples in the microfluidic chip when the outlet tubing is open. When the outlet tubing is closed with a valve, flow through the microfluidic device is terminated, and the input tubing can be moved to a new well without introducing a bubble, as shown in the flow chart of FIG. 1B.

Figure 4F:
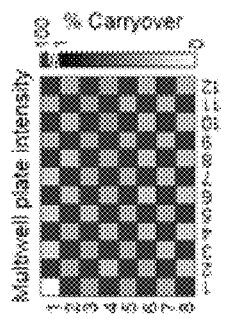
Figure 4H:
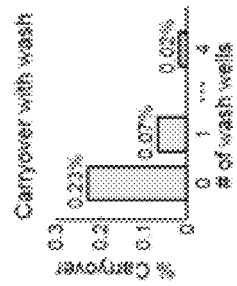

Because all liquids delivered from the multi-well plate flow serially through a single inlet tube in this system, the fluid contained within this tube passes through the microfluidic device before the subsequent wells' liquid enters. This delay is dependent on flowrate and volume contained within the inlet tubing. To minimize this delay, the inlet tubing used was as short and narrow-bore as possible to limit volume; a 22 cm, 250 µm inner diameter tube and contains ~11 µL. When automatically switching the inlet tubing from a water-containing well to a well containing fluorescent dye, an exponential change in fluorescence arises in the microfluidic device due to Taylor dispersion within the inlet tube, reaching a steady level in about 30 s (at 2 µL/s); hence, in this configuration, about 5 inlet tubing volumes must flow before the fluid switch is complete (FIG. 4D). A software control parameter, filling time ($t_{fill}$), can be determined by the user to ensure the next fluid has completely filled the inlet tubing before the next experimental step. Additionally, the inlet tubing transfer time ($t_A$) is rapid, requiring less than 2 seconds to change from one well to the next (FIG. 4D) and occurs during z-axis of motion (FIGS. 3A-3C). This water-to-dye fluid switch was automatically repeated across 96 wells (48 switches) and bubbles were not introduced into the microfluidic device, and well-to-well carryover in the microfluidic device was calculated as 0.32%±0.047% (standard deviation). Additional wash steps reduced carryover to less than 0.02% (FIG. 4H).

The system (with various integrated microfluidic devices) can also be used to reliably and automatically deliver and record neural step-responses in living organisms (FIGS. 5A-5F and FIGS. 6A-6J), run a novel functional screening assay (FIGS. 8A-8H), and execute a multi-duration and multi-step cell staining protocol (FIGS. 11A-11G). The system can be used directly in any other microfluidic applications, and various liquid transfer protocols can be adapted for use with this integrated and automated system.

Integration of any microfluidic device or system of varying complexity can be used for additional valve, backpressure, and flow rate control (multi-layer, on-chip valves, syringe pumps). Some available microfluidic device designs integrate various pressure-driven deformation valves to enable precise on-chip control of liquid flow during experimentation, which can be useful for multiplexing new on-chip multi-step applications with our robotic system. Additionally, use of these on-chip pressure-driven deformation valves can serve as an alternative method for flow control of all inlet and outlet channels during inlet tubing switches. Further, off-chip flow control devices like syringe pumps or vacuums can be integrated at inlets or outlets into this system to control flow rates and enable additional applications, which only use gravity-driven flow.

The versatility of our single-inlet design could enable automated transfer of liquids to virtually any microfluidic system. For example, our system could be used to deliver fluids to any liquid-containing chamber(s), device(s), and/or sample(s) that is interfaced with the robotic inlet tubing, such as thermoset polyester (rapid prototyped) microfluidics, silicone and glass microfluidic chips, paper-based microfluidics, and hydrogel microfluidics.

It will be understood that, while the embodiments shown above include only one inlet tube to interface one well of a multi-well plate to one inlet of a microfluidic device, it is possible to increase the number of inlet tubes interfaced to the same microfluidic device if delivery of liquid from more than one well of the multi-well plate is desired at a time. Depending on complexity, several modifications would need to be made to the overall systems design. In some embodiments, one or more additional inlet tubes can be mounted to the servo linkage. For example, a second inlet tube can be added such that both inlet tube tips are controlled by the same servo and z-axis of motion. In this way, two tubing tips can enter two adjacent wells of the multi-well plate at the same time, enabling the transfer of two independent liquids simultaneously. Then, as the waste tubing valve is opened, liquid from both wells of the multi-well plate can enter the microfluidic device, possibly through two separate inlets. In principle, the same software and backpressure method can provide automated tubing switches from two wells at a time to the same microfluidic device. This approach would be directly useful in an application requiring the delivery of mixed solutions, such as different buffer and pulse stimuli, as well as others. The number of additional inlets can also be integrated to this system in a similar way.

Examples

The systems and methods of the present disclosure are described in the following Examples, which are set forth to aid in the understanding of the disclosure, and should not be construed to limit in any way the scope of the disclosure as defined in the claims which follow thereafter. The following examples are put forth so as to provide those of ordinary skill in the art with a complete disclosure and description of how to make and use the embodiments of the present disclosure, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

Materials & Methods

Robotic System Custom Build and Parts

The multi-well plate x-y position and vertical inlet tubing position (z) were controlled by an Arduino® Uno R3 microcontroller, interfaced with two motor shields (DC Motor Stepper and Servo Shield, Adafruit), two position limit switches, and two 12 V stepper motors (NEMA-17, Adafruit). As shown in FIGS. 2A-2G, the plate holder can move on V-Slot®; linear rails (OpenBuilds™) for x-motion, and a linear bearing supported slide rail for y-motion. The custom multi-well plate holder was constructed out of aluminium and mounted to the 15 mm diameter linear bearing slide. The servo linkage mount design comprises three main parts (for z-motion): the servo mount to the V-Slot® linear rail (three parts), two linear slide rails, and an aluminum threaded linkage attached from the servo arm to the plastic block slider by brass screws. A section of hollow aluminium tubing is mounted to the block slider by pressure fit, which allows for the replaceable Teflon® inlet tubing to slide through. A small hole is aligned to the hollow aluminium tubing mount, the block slider, and the Teflon tubing to tighten a hex set screw that securely holds the tubing in place and prevents the tubing from slipping. This fixation allows for the inlet tubing, cut at a steep angle (~45°) at the tip, to puncture a thin plastic wrap cover on the multi-well plate without sliding. Each limit switch is placed at the maximum x- and y-direction for 'homing' the stage on A1 of a 96 well plate.

C. elegans Culture

The C. elegans strain NZ1091 was integrated by irradiation and backcrossed at least 10×. Animals were grown and maintained at 20° C. on NGM plates with OP50 E. coli bacteria. At least 12 hrs prior to experimentation, L4 stage C. elegans were picked and transferred to 50 µM All Trans Retinal (ATR) in OP50 E. coli spotted onto an unseeded NGM plate. For the dose response experiment, C. elegans were selected as L4s the day before and tested as young adults the next day.

The following strains were used:
"AWA:GCaMP&Chrimson" NZ1091, kyIs587[gpa-6p::G-CaMP2.2b, unc-122::dsRed];
kyIs5662[odr-7p::Chrimson::SL2::mCherry, elt-2::mCherry]
"AWA::GCaMP" CX14887, kyIs587[gpa-6p::G-CaMP2.2b, unc-122::dsRed]
"ASER::GCaMP" IV28, ueEx10 [gcy-5::GCaMP3, unc-122::gfp]

Experimental Control and Automation

A suite of Arduino® and Micromanager scripts were developed to automate experimental timing, serial liquid delivery patterns, optogenetic stimulation, and image acquisition. A MicroManager graphical user interface (GUI) script enables user control of camera configuration and illumination settings (exposure, pulse duration, pulse delay, binning) and coordinates the timing of stimuli via digital pulses (e.g. microfluidic valves, optogenetic LED pulses, or others) with the robotic plate positioning system via serial commands to two Arduino® Uno microcontroller boards (FIGS. 3A-3F). With this set-up, the same experiment settings (recording and stimulation) can be executed for each well position.

The robotic system can function independently through customizable Arduino®, MATLAB™, or MicroManager code suites.

The Arduino® script defines the well plate positions (motor steps per position), servo arm range, and timing of series of movement. Hence, it is adjustable to other well configurations (e.g. 384-well plates), and deep (2 mL per well) or shallow (300.mu.L per well) 96-well-plates. In a typical configuration, Arduino® code reads in serial information to control the plate position and tubing position (servo arm) via easily understood commands. For example, the 'homed' state (command: '0') raises the servo arm and sets the x-y plate position to A1. The typical command syntax is [wellRow][wellColumn][+ or −], which raises the servo arm, sends the plate to the specified well, and either keeps the servo up (+) or lowers it down (−). Commands can be strung together with a semicolon delimiter for immediate execution. For example, the string 'A1-; A2-' moves the plate to well A1, lowers the servo and tubing ('-'), then immediately raises it again, move to well A2, and lowers the tubing once again and remain in this configuration until another serial command is received.

Two Micromanager scripts "GUI" and "RUN" can be used to define and coordinate robotic plate and tubing positions (via serial commands, as above) with fluidic valves and microscope image capture. GUI sets up experiment parameters, and RUN executes them.

An alternative MATLAB script can automatically generate and send serial commands directly to the Arduino. It defines the timing between movement steps and pattern of position strings. In this manner, the robotic system can be sent a series of well-plate positions and durations in each well for experiments requiring different lengths of time spent in each well.

Together, the "low-level" Arduino script allows for fine adjustments to the robotic system (for using different plate sizes and volumes), whereas "high-level" MATLAB or MicroManager scripts can be used to define for each experimental protocol the well position sequences and timing.

Figure 4E:
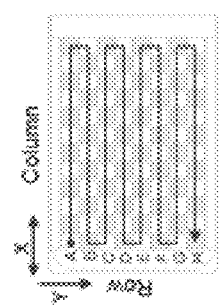
Figure 4G:
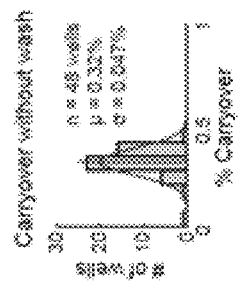

FIG. 1A shows a model of the robotic platform comprised of a custom multi-well plate holder and servo mounting assembly providing z-axis of motion to lift the fluid inlet tube and a linear slide rail and v-slot bars for x/y-motion (purple arrows) to adjust multi-well plate position. FIG. 4A shows a schematic of integration of the robotic platform and microfluidic device and control systems. The inlet tubing (in) is moved by a servo linkage controlled by an Arduino microcontroller (1) which also moves the multi-well plate position. A second inlet port and valve for backpressure (bp) allows inlet switching without introducing an air bubble. This valve and an outflow valve (out) are controlled by a second Arduino microcontroller (2), which also triggers illumination according to the image capture computer. FIG. 4B shows the microfluidic device requires at least two liquid inlets, one for the multi-well inlet (in) and one for backpressure (bp), and one waste outlet (out). Microfluidic devices may be reversibly sealed (reusable), or permanently-bonded (typically single-use). FIG. 4C shows a zoomed-in side view of the inlet tubing and proper backpressure balance; too little may introduce a bubble upon tubing transfer, too much may transfer a droplet of the previous inlet fluid to the next well. FIG. 4D shows the quantification of fluid switching dynamics by fluorescein dye. Inlet solutions were switched from buffer (A1, white) to dye (A2, yellow) back to buffer (A3, white). Inset shows at 20-40 s after the switch to buffer, indicating that complete switching to a stable level (<0.1% max) was achieved after about 30 s (red dotted line). FIG. 4D shows the timing and actuation state (on/off) of both backpressure (bp) and outlet (out) valves are illustrated along the x-axis during the switch, where they alternate during the transition ($t_A$, z-up to z-down) with a brief overlap (is) to ensure balanced flow before filling ($t_{fill}$) and recording ($t_{A3}$). FIG. 4E-G shows how the completely automated switching from buffer to dye was repeated across all 96 wells with $t_{fill}$=30 s and recorded for 15 s at each well (top left). Percent carryover was calculated for each buffer well to determine how much of the previous fluorescein-containing well had been transferred (bottom left). The maximum carryover was measured to be 0.4% (0.3±0.014) with a 30 s interval between wells.

Bubble-Free Transfer of Inlet Tubing

To prevent a bubble from entering the inlet tubing when transferring the tubing from one well to another, a balanced backpressure (bp) system was developed. A backpressure reservoir connected to the device applies a small positive hydrostatic pressure relative to the multi-well plate by elevating its fluid surface a few cm above the fluid surfaces in the multi-well plate. During stimulus switching, the outflow valve is closed and the backpressure valve is opened, leaving a fluidic path from the backpressure reservoir to the inlet tubing. The backpressure is adjusted such that no bubble enters the tubing (bp too low) and no droplet forms at the inlet tubing (bp too high), which could transfer a small amount of the current inlet fluid to the next well causing "carryover" (FIG. 4C). Once the robotic system positions the inlet tube into the next well, the backpressure valve is closed and the outflow valve is opened, and the next fluid begins to flow through the microfluidic device.

PDMS Device Preparations

Single layer silicone master molds were designed using DraftSight and fabricated in the WPI MicroFabrication Laboratory cleanroom. All bonded and reusable PDMS devices were prepared as previously described. Devices were permanently-bonded to standard 1 mm thick glass slides for in vitro experiments, and reversibly-bonded for the *C. elegans* chemical screen and dose response experiments.

Assessment of Well-to-Well Carryover

Stock fluorescein sodium salt was prepared at 1 mg/mL in water and diluted to 5 µg/mL in water as the final working concentration. A 96 multi-well plate was prepared with 600 µL of water or 5 µg/mL fluorescein in alternating wells following a snake pattern, yielding 96 serial well-switches. The full well plate was placed on the robotic plate holder with A1 in the top left corner and interfaced with a bonded microfluidic device with three ports punched for the inlet, back pressure, and outlet. TIFF stack movies were acquired with a Hammamatsu Orca Flash 4 sCMOS camera and an 4×/0.28 NA Olympus objective on an ASI RAMM microscope frame. Videos were recorded for 15 seconds per well (at 10 fps, 2×2 binning, 100 ms exposure) per well. A is delay was used between well switching. A 10 ms pulse of blue light (EGFP filter set) from a Lumencor SOLA source excited the fluorescein solution each image frame. A region of interest (ROI) was selected where all of the inlet channels converge (FIG. 12A) to image the immediate change in brightness flowing from the robotic inlet. A custom ImageJ macro automatically obtained the first, middle, and last frame of each acquisition (FIG. 12A) to form a montage stack summary, which recorded fluorescence intensity (FIG. 12B) at the same ROI (25×25 pixel square) across all wells. Intensity values over time were used to analyze well-to-well carryover in MATLAB17a. The carryover percentages were calculated by first subtracting camera baseline (background intensity in A1) from all values, averaging ROI intensity for each fluorescein well and the following water well, then dividing the baseline-corrected water well intensity by the prior fluorescein well intensity (FIGS. 12C-12D).

Chemical Dose Response Measurements

Diacetyl odor dilutions were prepared from a 1:1000 dilution of diacetyl (Sigma) in S. Basal, serially diluted in a multi-well plate. Salt solutions (0-40 mM) were prepared by diluting S. Basal buffer (100 mM NaCl) with an iso-osmotic buffer of 186 mM glycerol.

Solvent Preparation and Delivery for *C. elegans* Compound Screen

All solvents were prepared in Eppendorf tubes at 1% and 5% v/v concentrations to 1 mL in paralysis buffer (S. Basal buffer without cholesterol containing the acetylcholine agonist 1 mM (−)-tetramisole hydrochloride) and vortexed to mix for 30 s-1 min. Solvent dilutions were transferred to a 96 deep well plate (700.mu.L/well). Alternating control wells were filled with 100 ng/mL fluorescein in paralysis buffer to visualize alternating solution delivery. Animals were exposed to paralysis buffer flow for ~1-2 hrs prior to solvent delivery to keep animals stationary during recording. The 96 well plate was loaded with solvent solutions by hand the hour before recording and sealed with adhesive film (Glad® Press-n-Seal).

Calcium Imaging and Data Analysis

Methods followed those described previously. About 20-30 animals co-expressing GCaMP and Chrimson in the AWA chemosensory neuron pair were loaded into a modified high-throughput microfluidic imaging device optimized for 4× magnification with only the inlet, back pressure, worm loading, and outlet port(s) punched. Optical configurations were customized using an ASI RAMM frame and commercially available components for low-magnification wide-filed GCaMP excitation (4×/0.28 NA), compatible with Chrimson excitation, and high-resolution (1024×1024) 10 fps image acquisition. In addition to the optical set up described above, a 617 nm Mightex LED was mounted beneath the RAMM stage with an additional cube housing a 590 LP excitation dichroic to pass uniform Chrimson activation across the entire field of view. At each inlet well position, animals were exposed to solution for <1 min total, during which a 30 s delay was programmed to sufficiently fill the tubing after each well transfer for serially delivered solutions. Then, an immediate acquisition of 15 s (10 frames/s, 10 ms blue light pulse, 10 ms delay, 2×2 binning) began with a 617 nm light presence for 5 s (from 2.5 s to 7.5 s). Custom scripts were used for quantifying neuron fluorescence (Neurotracker ImageJ macro) and MATLAB17a for data analysis and visualization.

Immunohistochemistry Staining Solution Preparation

Staining solutions were prepared in the first 10 wells (A1-A10) of a deep (2 mL) 96 multi-well plate and interfaced with the robotic system. All solutions were prepared in phosphate-buffered saline (PBS) at 2 mL final volumes: 4% paraformaldehyde, 0.25% Triton-X™, 1% w/v BSA in PBS (0.4 g 40 mL), 2.5% Phalloidin (FITC labeled proteins, AF488 Phalloidin A12379), 0.0167% Hoescht. After staining, cells were preserved by applying cytoseal to all inlets and outlets and stored at 4° C. The remaining staining solutions in the 96 well plate could be reused multiple times when stored at 4° C.

Microfluidic Cell Culture Preparation

Human mesenchymal stem cells (hMSCs, P7-P8) were grown at 37° C. with 5% $CO_2$ in standard growth medium (hMSCgm bullet kit, lonza) to confluency. The cells were washed, trypsinized, centrifuged, and resuspended with 1-2 mL of fresh growth media to the desired cell density. The bonded PDMS device was removed from the oven (65° C. for ~2 hr) then vacuum dried for 15 min. By sterile technique, one inlet was covered with a drop of growth medium until the outflow well was filled driven by gravity flow (within minutes) with slight negative pressure. Next, the high-density cell suspension was pipetted to cover the same inlet well and allowed to flow into the device by gravity and slight negative pressure, then placed in the incubator to settle and attach to the glass surface overnight. The next day, the cell-loaded device was removed from the incubator and placed on the microscope stage (at room temperature), and connected to all tubing inlets and outlets as previously described. The backpressure solution (PBS) was used to fill the "input" inlet tubing by gravity driven flow prior to inserting it into the multi-well plate well.

Automated Cell Staining Example

At each well position, a 30 s delay was programmed to sufficiently fill the tubing after each well transfer for serially delivered solutions. The staining procedure was performed as follows, 30 s rinse of PBS, 10 min incubation in 4% paraformaldehyde, 30 s rinse of PBS, 10 min incubation in 0.25% Triton-X, 30 s rinse in PBS, 30 min incubation in 1% w/v BSA, 30 min incubation in 2.5% Phalloidin (FITC labeled proteins, AF488 Phalloidin A12379), 30 s rinse in PBS, 3 min incubation in 0.0167% Hoescht, and a final 30 s rinse in PBS. A TIFF image stack of the device channels with cells was recorded at 1 frame per minute for 90 min throughout the automated staining protocol using a pulse of blue light during each acquisition. Higher-magnification images of the stained cells were taken on a standard inverted Leica fluorescent microscope with overlaid FITC and DAPI filtered images.

Results

An Off-Chip Robotic Platform Interface for Microfluidic Devices

The robotic system disclosed herein enables automated serial liquid delivery from multi-well plates to microfluidic devices. The robot was designed to be cost effective (<$500) using commercially available parts (see FIG. 1C and FIGS. 2A-2G).

Two custom assemblies, the multi-well plate holder and servo linkage mount, were designed and custom built (FIG. 1C). The linear bearing supported slide rail (for x-direction of motion) and three-part aluminium well-plate holder supports the weight of a completely filled deep 96 multi-well plate (2 mL/well), allowing for experiments that may require long flow duration (FIG. 1C). The servo bar height can be adjusted for shallower multi-well plates. Components can also be prepared using 3D-printing in plastic.

The robotic platform interfaces with a microfluidic device by a fluid inlet containing the chemical input from the multi-well plate, and a backpressure (bp) inlet, and a waste outlet (out) (FIG. 4A and FIG. 4B). The system works with both reusable and permanently-bonded microfluidic devices. The backpressure system can be adjusted to prevent bubbles while changing the z-axis of motion (down to up position), and to prevent any backflow of the prior inlet fluid to the next well (FIG. 4C). The servo assembly enables the z-axis of motion to uniformly lift the tubing from liquid to air and back to liquid contact for the next well. This design also provides sufficient force for the tubing to puncture a plastic sealing cover film applied over each multi-well plate to prevent evaporation.

Because all liquids from the multi-well plate flow serially through a single inlet tube, the fluid within this tube must pass through the microfluidic device before the next stimulus enters, causing a delay dependent on flowrate and volume contained within the inlet tubing. For this reason, inlet tubing was as short and narrow-bore as possible; a 22 cm, 250 m inner diameter tube and contains ~11 µL. The concentration of dye solutions was monitored over time in a microfluidic device during serial switches between alternating fluorescein dye and buffer solutions (FIG. 4D-FIG. 4G). The inlet tubing transfer is rapid, requiring less than 2 seconds to change from one well to the next (FIG. 4D-FIG. 4G). The transition time ($t_A$) occurs during z-axis of motion (raising and lowering the tip into the next well). An exponential change in fluorescence arises due to Taylor dispersion within the inlet tube, reaching a steady level in about 30 s until the next wells' solution is completely in the microfluidic channels. A software control parameter, filling time ($t_{fill}$), can be chosen to ensure the next fluid has completely filled the inlet tubing before the next experimental step.

To demonstrate the functionality of this well-to-well switching paradigm across an entire 96 well plate and to monitor fluid carryover across wells, every well was imaged in sequence, filled with an alternating set of fluorescein dye and water (FIG. 4E-FIG. 4F). With a 30 s delay between switches for flushing inlet tubing, cumulative carryover was less than 0.5% (mean 0.329%) after 96 automated serial well switches, consistent recording across all wells (standard deviation 0.047%, FIG. 4F). Lower carryover values could be obtained by transferring the input tubing to a wash well prior to the next chemical, or by extending the fill time (FIG. 4H).

FIG. 5A shows a schematic view of worms expressing GCaMP in specific neurons in the PDMS microfluidic device sandwiched between glass slides. FIG. 5B shows a fluorescence image of an animal expressing GCaMP in the AWA sensory neuron pair. FIG. 5C shows a two-arena high-throughput microfluidic pulse device showing delivery of a stimulus to two separate worm arenas. Either the input stimulus (in, fluorescein for visualization) or buffer can bathe the animals depending on which control channel flows (c1 for input, c2 for buffer). FIG. 5D shows the timecourse of a typical dose response experiment. Triplicate pulses (10 s) are delivered once per minute at a given concentration, followed by an increase in concentration with a delay of ~45 s. FIG. 5E shows the average normalized GCaMP response traces from AWA::GCaMP neurons (mean across animals) for steps from 0 (buffer) to 0.1, 1, 10, 100, and 1000 µM diacetyl. FIG. 5F shows the average normalized GCaMP response traces from ASER::GCaMP neurons (mean across animals) for steps from 40 mM NaCl to 40 mM-0 mM NaCl, with declines of 0, 0.1, 1, 5, 10, 20, 40 mM.

Automated chemical dose response of two chemosensory neurons in *C. elegans* to the odor diacetyl from a single experiment is shown in FIGS. 6A-6J. FIG. 6A shows a schematic of the multi-well plate prepared with buffer (FIG. 6B) and serial dilutions of diacetyl odor, from 10-9 (11.5 nM) to 10-3 (11.5 mM). A gray dot indicates the first well position. FIG. 6B shows a reusable two-arena pulse microfluidic device with four fluidic inlets, two worm-loading ports, and an outlet. The device switches between the stimulus inlet (in), shown with high concentration fluorescein, and unlabeled buffer, depending on which of two control channels (c1, c2) are flowing (Supplementary Video S2). Channel c1 flows while c2 is closed, such that stimulus fluid flows through the animal arenas (scale bar, 500 µm.) FIG. 6C shows a cross-section schematic of a worm head expressing GCaMP in a single neuron in the microfluidic assembly. Arrow points to the fluorescent cell body (soma) as in FIG. 6D. FIG. 6D shows a wide-field (4×) fluorescent image of 36 animals expressing GCaMP in either ASH (arrows on the left) or AWA (arrows on the right) chemosensory neurons in the device. FIG. 6E shows magnified images from FIG. 6D of animals expressing GCaMP in either ASH (left) and AWA (right) chemosensory neurons. Arrow points to soma (scale bar, 100 µm). FIG. 6F shows a time course and average normalized fluorescence (ΔF/F0) dose response traces for AWA and ASH neuron cell bodies. Four pulses (10 s each) were delivered once per minute at each increasing concentration (or buffer). Lines and shading represent mean and SEM across four pulses, n=72 traces per concentration and neuron type. FIG. 6G shows mean peak normalized calcium responses for AWA neurons across seven increasing odor steps and buffer. Data points show population average and SEM (n=18) for each of four repeated pulses per concentration. Trace represents a third-degree polynomial fit of each concentration's pulse average. FIG. 6H shows mean peak normalized calcium responses for ASH neurons, as described in FIG. 6G. FIG. 6I shows mean peak normalized calcium responses of AWA plotted against ASH for each individual odor pulse. Error bars represent SEM for AWA and ASH, per concentration (corresponding dot color). FIG. 6J shows a neural network wiring diagram illustrating chemical synapses (arrows) and gap junctions (flat ends) for AWA and ASH sensory neurons and four first layer interneurons. Diacetyl is detected by different affinity receptors on each sensory neuron.

Figures 7A, 7B, 7C, 7D:
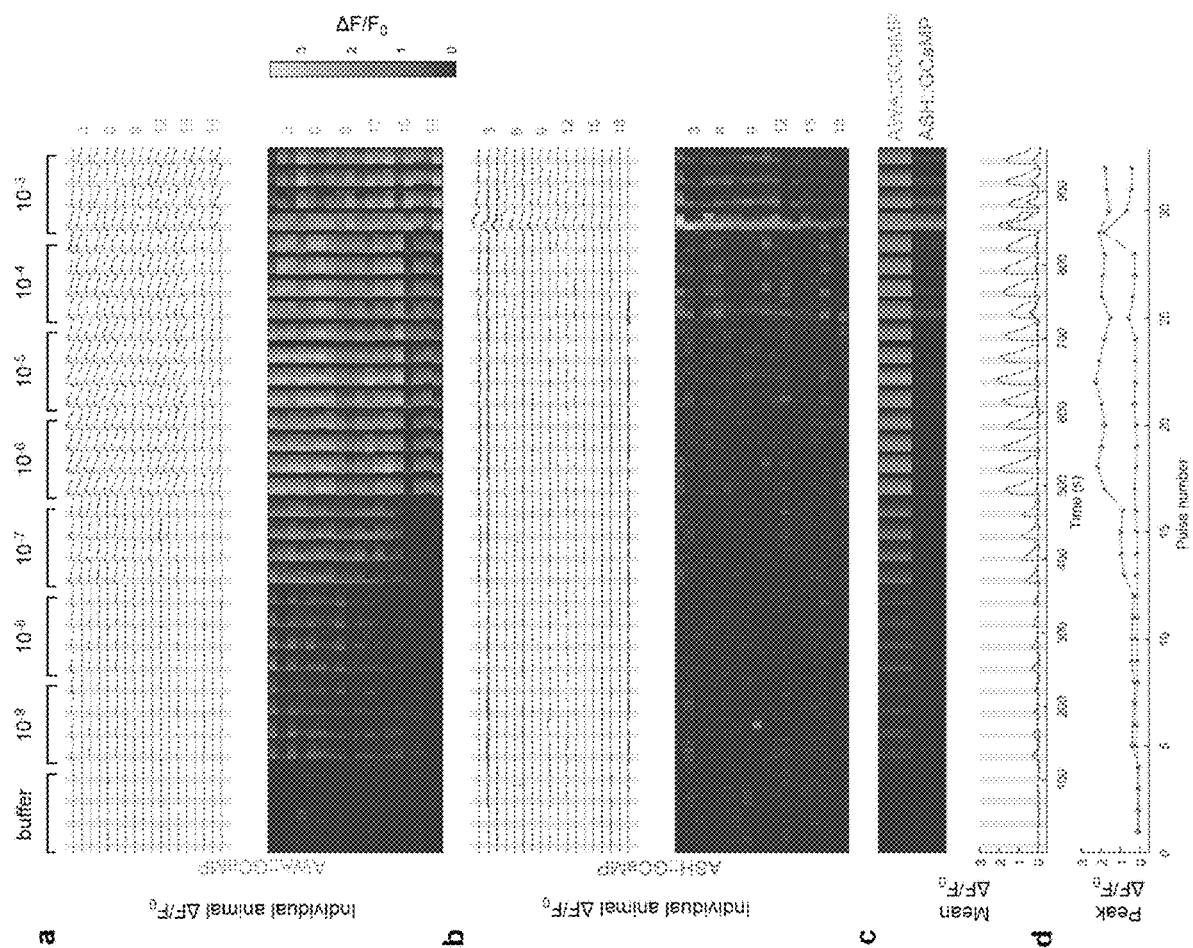
FIG. 7A-FIG. 7D illustrate the calcium dose-response summary across multiple pulses, concentrations, and neurons in an automated odor step response experiment from FIG. 6.

Individual ΔF/F0 calcium response traces for 18 AWA::GCaMP animals across all pulses (gray shading) and concentrations (first four buffer, then 11.5 nM to 11.5 mM with 10 fold step increases), as summarized in FIG. 6. Traces are sorted in descending order by the first pulse max response to $10^{-7}$, or 1.15 µM. A corresponding heat map of individual responses is shown below (FIG. 7A). Individual ΔF/F0 calcium response traces for 18 ASH::GCaMP animals, and sorted in descending order by the first pulse max response to 10-3, or 11.5 mM. A corresponding heat map of individual responses is shown below (FIG. 7B). Population-average fluorescence ΔF/F0 calcium responses by neuron (AWA::GCaMP above, ASH::GCaMP below) across all pulses and concentrations corresponding to timing above, shown as a heat map (above) and mean traces (below). Shading represents SEM (FIG. 7C). Mean peak ΔF/F0 calcium responses by genotype across all pulses and concentrations corresponding to c. Shading represents SEM (FIG. 7D).

Automatic Determination of Chemical Dose Responses in C. elegans Sensory Neurons A dose response determines the sensitivity of a neuron or cell to a chemical cue. In C. elegans, microfluidic devices have been used to monitor neural activity in many animals at once expressing a genetically encoded calcium sensor (GCaMP) in selected neurons. Such systems were used to manually generate dose-response curves. A completely automated dose response system was set up, with serially-diluted stimuli being filled in a 96-well plate. Young adult C. elegans expressing GCaMP in the AWA chemosensory neurons were immobilized in a microfluidic device (FIG. 5A and FIG. 5B) and stimulated with 5-s pulses of diacetyl odor in increasing concentrations (FIG. 5C and FIG. 5D). AWA::GCaMP animals were pulsed three times every minute with diacetyl, and odor-evoked neural responses strengthened with increasing odor concentration from 0.1 µM to 1 mM (FIG. 5E), as observed previously. Animals expressing GCaMP in the ASER chemosensory neuron, which responds to salt downshifts, were stimulated with triplicate repeat pulses of NaCl, decreasing from a base 40 mM NaCl to a variable level from 40 mM (0 change) to 0 mM (−40 mM change). These results suggest that a minimal but robust odor response occurs in AWA at a 0.1 µM diacetyl concentration, and a similar response in ASE occurs with a NaCl shift from 40 mM to 35 mM.

FIG. 8A shows how a reusable microfluidic device was interfaced via the robotic system to a 96 multi-well plate containing 700 µL of fourteen common solvents at two different concentrations (1% and 5%), with control S. Basal buffer alternating between each compound and concentration (gray shading in wells). FIG. 8B shows a fluorescence image of 20 young adult animals expressing GCaMP and the red-light-sensitive ion channel Chrimson in the AWA sensory neuron pair of each animal (green arrows). FIG. 8C shows a schematic of the optogenetic reagents expressed in AWA neurons. Chrimson is activated by 617 nm red light, activating the neuron and increasing intracellular calcium. GCaMP, excited by 470 nm blue light, emits green light (525 nm) in proportion to intracellular calcium. FIG. 8D shows a heat map representing 1,140 peak neural responses in 20 animals across all 57 solutions from a completely automated robotic screen. The heat map is sorted across peak animal responses to (black box column A11, buffer well 6). FIG. 8E shows bar graphs showing relative peak response compared to prior buffer controls, where almost all solvents screened cause a decrease in peak responses. Asterisks represent statistically significant differences compared to immediate prior controls (p<0.001), after Bonferroni multiple comparisons test. FIG. 8F shows the population average peak neural activation response across all tested wells (black line) to each compound, with shading representing standard deviation, and one animal's peak response (animal 8) highlighted (gray line) to demonstrate individual traceability. FIG. 8G shows the averaged animal responses to 5 s of optogenetic stimulation (shading) for wells 9-13, n=20 animals per well. Shading represents standard deviation, solid black line is mean, and gray line is animal 8 as in FIG. 8F. FIG. 8H shows the boxplot quantification of peak fluorescent values during optogenetic stimulation from FIG. 8G, with animal 8 response as dot per well number, n=20 animals per well. Asterisks represent p<0.001 compared to prior controls, and no significant differences between solvent wells (9, 11, and 13).

FIGS. 9A-9G show an automated C. elegans solvent screen that yields suppressors of optogenetically-activated neural responses, represented previously in FIG. 8. FIG. 9A shows a multi-well plate map showing 57 wells containing solvents at 1% and 5% concentrations alternating with control S. Basal buffer (gray fill). Diagram below shows the optical path for simultaneous stimulation and monitoring of neural responses, via 470 nm blue excitation of GCaMP and green emission, and 617 nm red light stimulation of the Chrimson ion channel. FIG. 9B shows a wide-field 4× fluorescence image of young adult animals co-expressing GCaMP and Chrimson in the AWA sensory neurons in each animal (arrows) within a reversibly-sealed single-arena microfluidic device. FIG. 9C shows a schematic of excitation and emission wavelengths used for simultaneous optogenetic stimulation of AWA sensory neurons using Chrimson and recording of intracellular calcium levels with GCaMP. FIG. 9D shows a heat map representing 1,140 peak normalized neural responses (ΔF/F0) across 20 individual animals and 57 solutions. Horizontal blue box highlights animal #8, identified in FIG. 9B. FIG. 9E shows a box plot shows population average peak ΔF/F0 neural activation response for each compound. Symbols represent statistically significant mean peak differences compared to immediate prior controls (*p<0.001, ANOVA repeated measures with Bonferroni correction). Boxes indicate 25th and 75th percentiles, whiskers extend to 1.5 times the interquartile range, and outliers are indicated with diamond symbols. FIG. 9F shows bar graphs show the difference in mean peak ΔF/F0 response between each solvent concentration and its immediate prior buffer control. Error bars represent SD. Symbols represent statistically significant relative mean peak differences (*p<0.001, paired one-sample t-tests with Bonferroni correction). FIG. 9G shows an example of neural traces that show suppression of optogenetic stimulation by isopropanol. Population average animal ΔF/F0 calcium responses (black line) to 5 s of red light stimulation are shown for wells 9 to 13 (outlined in d). Shading represents SD. Gray lines indicate responses from animal 8.

Figures 13A, 13B, 13C:
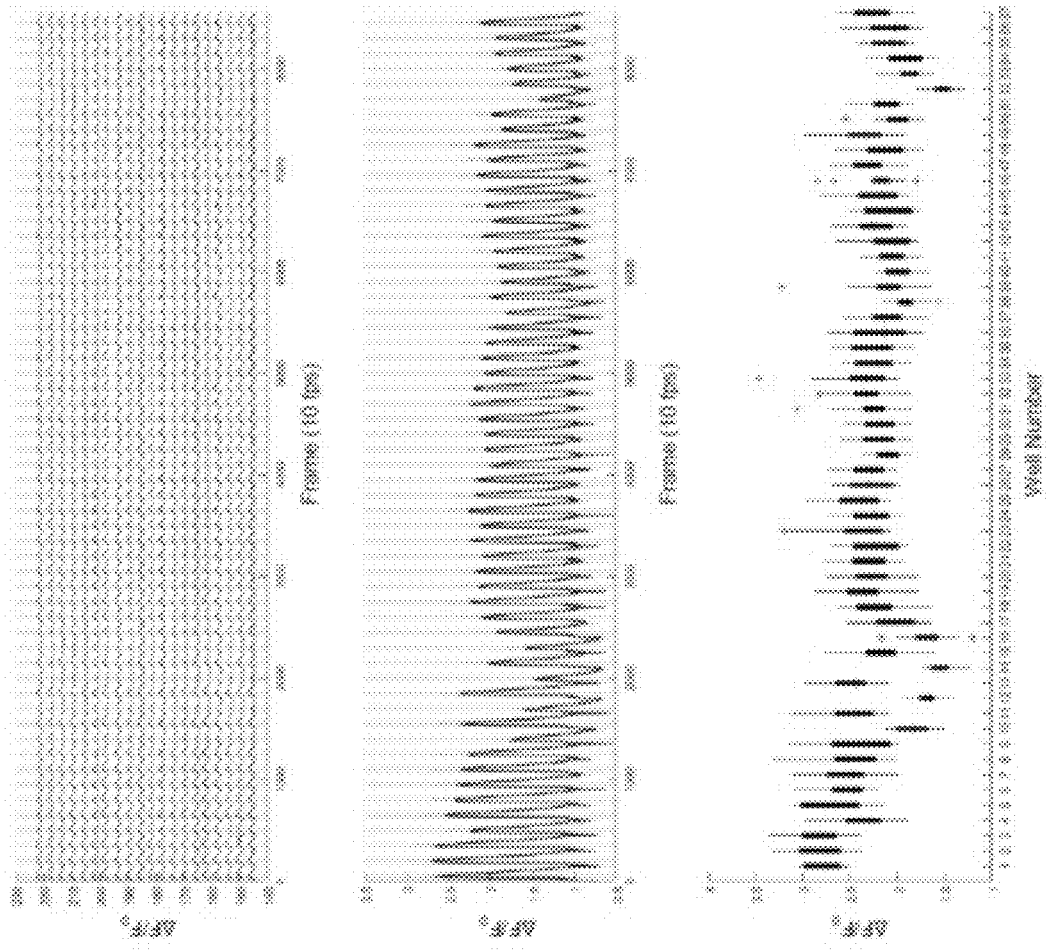
FIG. 13A-FIG. 13C show the breakdown of animal responses for heat maps.

FIGS. 13A-13C show animal responses for heat maps. FIG. 13A shows individual animal responses, FIG. 13B shows averaged animal responses, and FIG. 13C shows peaks of animal responses as in FIGS. 8A-8H and FIGS. 9A-9G. FIGS. 14A-14D illustrate calcium responses to optogenetic activation pulses in different buffers, solvents, and carriers. FIG. 14A illustrates individual ΔF/F0 calcium response traces for animals co-expressing GCaMP and Chrimson in AWA sensory neurons (n=20) across all 57 red-light pulses (red shading, 38 mW/cm2) and 57 liquid delivery wells (alternating buffer-solvent concentrations, gray shading represents buffer wells). Traces are sorted in descending order by well 11 (buffer). FIG. 14B illustrates a corresponding heat map to FIG. 14A. FIG. 14C illustrates averaged ΔF/F0 calcium responses (black line) from 20 animals across all 57 pulses and liquids delivered, corresponding to individuals in FIGS. 14A-14B. Shading represents standard deviation. FIG. 14D illustrates mean peak ΔF/F0 calcium responses (black line) corresponding to FIG. 14C. One individual animal (#8) is shown by the dots and gray line. Shading represents standard deviation.

An Automated Compound Screen Yields Suppressors of Neural Activity in C. elegans The robotic system was used to screen 14 different solvents at two concentrations (1% and 5%) for their effects on optogenetically-evoked neural responses. Solvent dilutions were prepared in a 96-well plate alternating with buffer control wells (FIG. 8A). A previously established high-throughput imaging device was used to record calcium signals from individual neurons of 20-25 young adult animals (FIG. 8B). Animals co-expressed the red-shifted channelrhodopsin (Chrimson) and the genetically encoded calcium sensor (GCaMP2.2b) in the AWA chemosensory neurons (FIG. 8C), allowing simultaneous optical stimulation and monitoring of neural responses. Red-light-induced responses were consistent across buffer control wells (FIG. 10A). Most solvents also did not affect neural responses (FIG. 8D). However, 5% acetonitrile and both 1% and 5% isopropanol and methanol significantly suppressed peak fluorescent responses to Chrimson-induced responses across the entire population. These effects were transient, as returning to buffer fluid rapidly restored responses (FIG. 8D-FIG. 8G). Additionally, 5% ethanol, and 1% DMSO show variable and weakly suppressed responses compared to prior buffer exposure. Responses were consistent among individual animals. For drug screening applications, these results suggest that isopropanol, methanol, acetonitrile, and ethanol should be avoided due to their potential effects on sensory neural excitability.

Figure 10B:
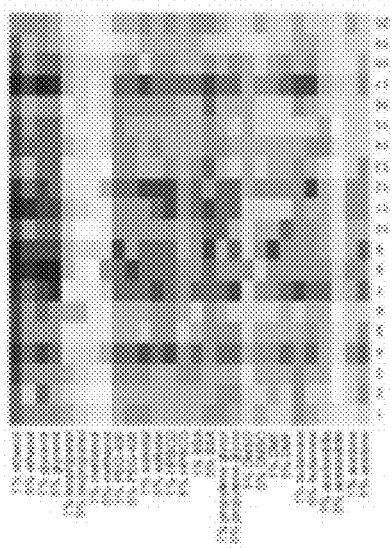
FIG. 10A-FIG. 10D show the breakdown of analysis for heat maps.
Figure 10D:
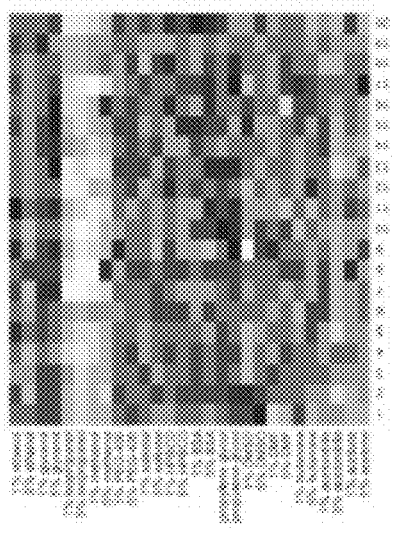
Figure 10A:
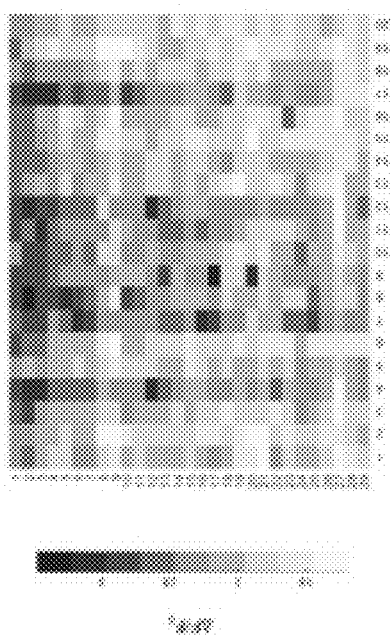
Figure 10C:
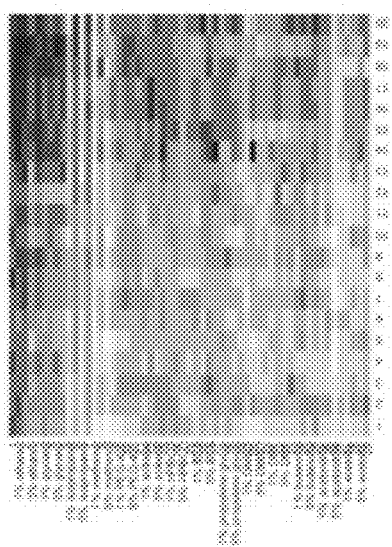

FIG. 10A shows buffer only wells vs. animal responses, FIG. 10B shows solvent only wells vs. animal responses, FIG. 10C shows sorted responses by peaks for buffer 6 (shown in text), and FIG. 10D shows solvent only wells vs. animal responses normalized to prior controls.

Figure 11B:
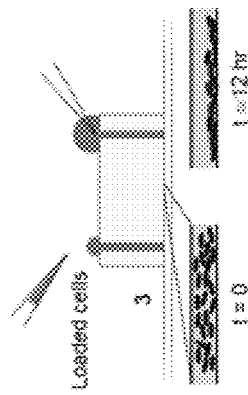
FIG. 11A-FIG. 11G show the automation of a about 90 minute cell staining protocol.
Figure 11A:
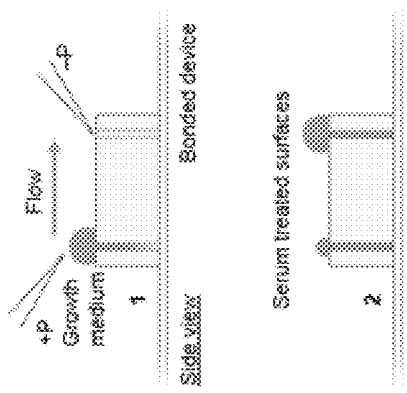
Figure 11C:
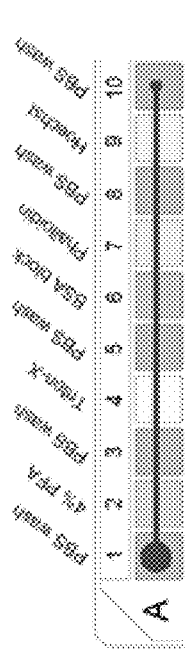
Figure 11D:
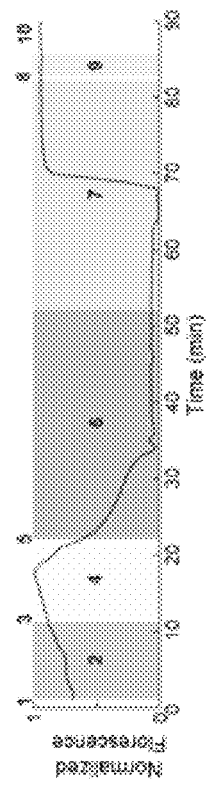
Figures 11E, 11F, 11G:
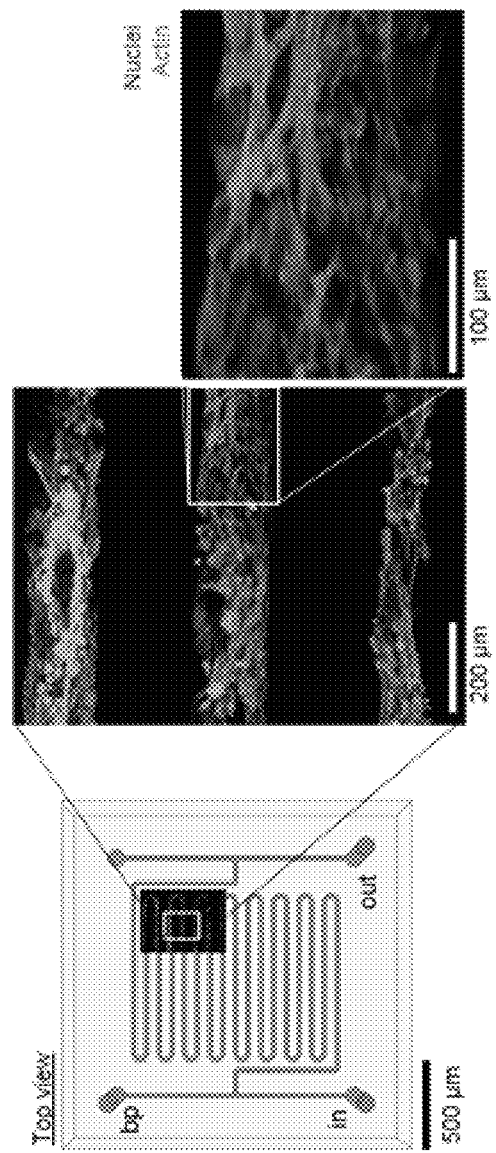

FIG. 11A shows a side view of a simple preparation of loading cells into a permanently bonded microfluidic device (1-2) by treating surfaces with growth medium, then loading cells (3) by gravity flow with slight negative pressure, then allowing cells to adhere to the glass surface overnight. FIG. 11B shows a schematic of the fluid inlet (in), backpressure (bp), and waste outlet (out) connections. FIG. 11C shows the solution preparation and serially-timed protocol for a standard immunofluorescent staining procedure. Solutions were loaded into a deep (2 mL) 96-well plate in 10 wells. FIG. 11D shows the timecourse of mean fluorescence monitored throughout the staining procedure. Times during which each fluid (1-10) passed through the microfluidic device are indicated. FIG. 11E shows a top down view of the microfluidic device design and final stained sample area of cells following the protocol in (C). FIG. 11F shows a zoomed-in area of cells in the microfluidic channels after completion of the staining protocol. Green, phalloidin staining of actin; blue, Hoechst staining of nuclei. FIG. 11G shows aligned actin filaments and nuclei staining in one channel from (E) demonstrating successful antibody localization and execution of each step in the automated protocol.

Automated Multi-Step Cell Fixation and Staining in a Microfluidic Device

Histochemical staining is a laborious process, requiring typically several manual steps of fixation, washes, blocking, and labeling with visible or fluorescent probes over one or more hours. To automate this process, a bonded H-channel microfluidic device was prepared and seeded with human mesencymal cells (hMSCs) one day prior to staining (FIG. 11A). At room temperature, the device was connected to multi-well plate containing 10 wells filled with each staining procedure solution. A 90 min total duration cell staining protocol (FIG. 11B and FIG. 11C) was selected using a custom MicroManager script which determined of well position and duration and synchronized image acquisition with user-determined camera settings. Steps were: paraformaldehyde fixation, Triton-X permeabilization, BSA blocking, phalloidin staining of actin, and Hoechst staining of nuclei, Flow was automatically paused for durations lasting longer than 45 s, allowing for the microfluidic channels to fill entirely with each delivered compound and preventing the well from running out during long exposures. Changes in fluorescence were observed during BSA blocking, and during fluorescent staining of actin at ~70 min (FIG. 11D). High-magnification images (20×) of both actin and nuclei show aligned filaments within the channel (FIG. 11E-FIG. 11G).

DISCUSSION

The robotic interface disclosed herein automates serial liquid delivery to on-chip devices. The graphical user interface provides user flexibility in protocol design (timing of each chemical presentation), while complete automation of liquid-transfer spares laborious manual cost and effort and eliminates user error. Interfacing with multi-well plates allows for customizability of serial liquid delivery protocols and commercially prepared liquid libraries, increasing throughput of screening using microfluidic devices. The modularity of the design allows for transfer to microscope or non-image based platforms.

For devices that have other inlets (like the flow shifting pulse device), a separate backpressure valve and reservoir may be used, as any other reservoir can be used to provide back pressure.

Flow rates through the device, and the speed of chemical switching, could be increased using vacuum pumps at the outflow tubing.

Various depths of multi well plates may be used for certain applications and requirements of liquid volume proportional to flow rates. Small volume plates may still be suitable for long exposures, if flow can be stopped periodically such as in the cell staining example. Alternatively, multiple wells can be filled with the same solution drawn from in sequence.

Scripts can be customized from experiment to experiment, changing delays, timing, camera settings, and further developed for specific applications. For example, the sequential order of chemical delivery can be randomized by computer algorithm.

Valves may be added and turned on and off at different times for various applications, to direct different flows. For example, a valve could direct microfluidic streams into a collection vial, such as to collect cells after trypsin treatment into another collection tube for further analysis.

Wells can be revisited in any combinations and timing durations, subsequent wells can be filled with more volume of odors to extend flowing exposure. Wells could be further refilled during an experiment, manually or by robotic pipette or pump.

Combining this robotic platform with a high-throughput microfluidic imaging device can reveal fast-acting suppressors of neural activity in 20 individual C. elegans. This same imaging and timed protocol can be applied to other compounds (such as drug libraries) to assess potential activators and suppressors of neural activity. For example, solvents can have acute suppressive effects on neuron activity, and may cause to abnormal development over chronic exposure durations in many organisms. The example automated solvent screen demonstrates that even brief periods of exposure can have suppressive effects on stimulated neurons at low (1%) and high (5%) concentrations during <45 s of total exposure. These acute suppressive effects can also be rapidly restored, shown by alternating serially-delivered buffer control wells. The most significant suppressive effects found in our screen were caused by alcohols (5% ethanol, methanol, and isopropanol) and 5% acetonitrile, with weaker suppressive effects from 1% DMSO, DMF, and 5% acetone. These results support careful selection of solvents for preparing drug screen libraries using liquid systems and considering appropriate controls or interactions between compounds and solvent effects on stimulated neurons.

Disclosed herein is the complete automation of a 90 minute cell staining protocol. Using this interface facilitates the ability to save reagent volume and cost, only requiring microliters of solution. Furthermore, the highly-viscous Triton-X buffer (~270 centipoise at 25 C, 270× greater than water) was able to pass through the robotic inlet tubing and wash through to successfully to allow for critical subsequent liquid delivery.

Towards high-content and high-throughput screening, the disclosed platform enables >15 min of constant flow (2 uL/s) per well of a deep (2 mL/well) 96 multi-well plate. Using commercially prepared multi-well plates, it is now possible to automatically screen a complete small-molecule library across individual animals, cells, or other biological samples to detect changes in fluorescent indicators at brief time scales (seconds to minutes).

Referring now to the movie frames shown in FIGS. 17A-17F, the first movie frame image (FIG. 17A) shows the robotic system completely integrated with a microscope and computer for automated control at t=0 seconds before manually loading the multi-well plate. All subsequent images shown (FIGS. 17B-17F) were recoded during a fully automated process. The second image (FIG. 17B), taken at t=11 seconds, shows a top view of the robotic system and multi-well plate at the 'home' A1 position. At 16 seconds (FIG. 17C), the back view of the robotic system is shown to display the tubing inlet in well A1 via the custom linkage design. When the robot tubing is in the well, valves are actuated and fluorescent light is shown at the 18 second time point (FIG. 17D), allowing for recording of fluorescent compounds within the integrated microfluidic device while exposed to liquid flow from the current well. Finally, at the later 26 and 45 second time points of the video (FIGS. 17E and 17F), a side angle view is shown to demonstrate the change in x-axis and y-axis of automatic motion of the multi-well plate with punctured holes in the multi-well plate film cover due to previous successfully visited wells. Edited video timing does not correspond to actual image acquisition time. Computer designs of the robotic system components are shown in FIGS. 2A-2G, 3A-3F, and 4A-4H.

Figure 18B:
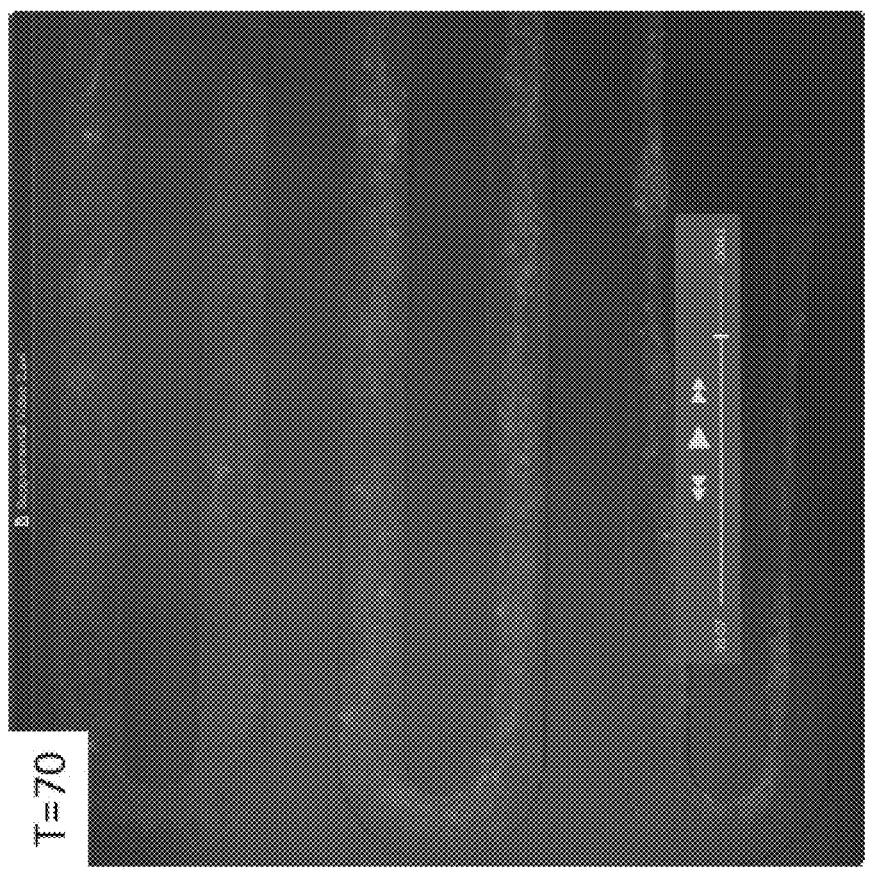
FIGS. 18A and 18B show two different and sequential screen shot time points (in minutes) of the field of view during the automated staining process, with qualitative differences seen in fluorescence at 70 min in the channels due to successful staining of actin.
Figure 18A:
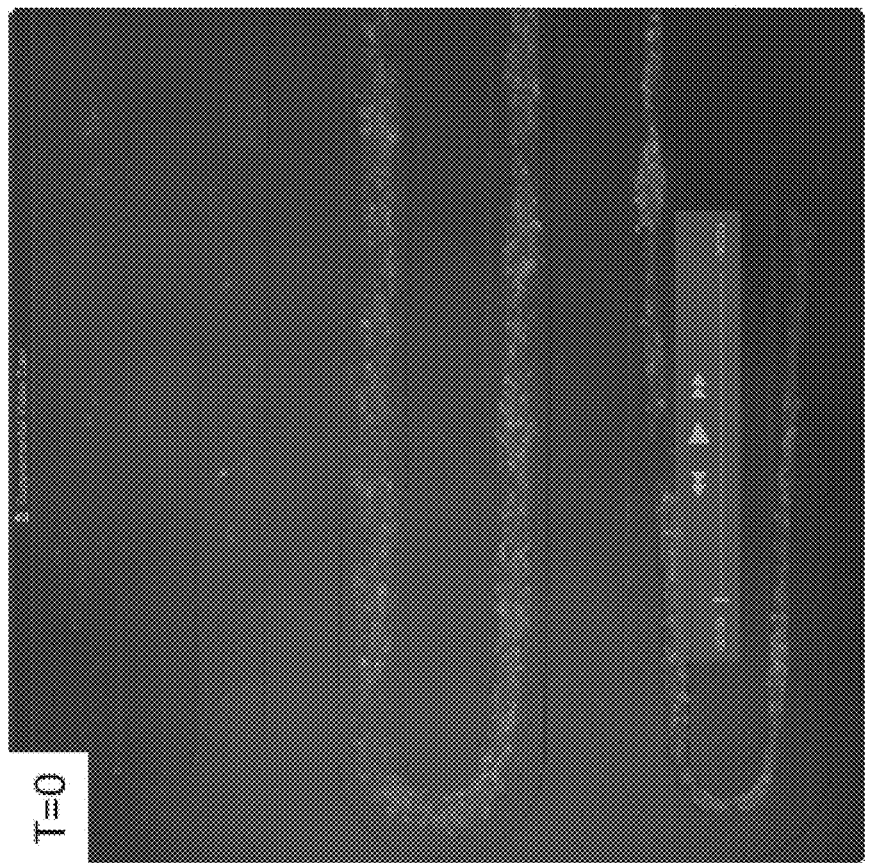

Referring now to FIGS. 18A and 18B, a 90 minute long video (acquired at 1 frame per minute) recorded the contents within an integrated microfluidic device while the automatic 10 step staining protocol (FIGS. 11C-11D) was executed using the robotic system. The first video frame (FIG. 18A) shows a black and white fluorescent image of the cell contents within a serpentine microfluidic channel at t=0 minutes. Cell nuclei appear autofluorescent, while cell structure (actin) are not visible. At 70 minutes later (FIG. 18B), t=70, cell actin structure becomes visible, filling in the background of the microfluidic channels and confirming successful execution of previous steps automated by the robotic system. A fused, color image at >70 min time point is shown in FIGS. 11F-11G.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It can be appreciated that several of the above-disclosed and other features and functions, or alternatives thereof, may be desirably combined into many other different systems or applications. All such modifications and variations are intended to be included herein within the scope of this disclosure.

What we claim is:

1. A system for delivering fluid to a microfluidic device, comprising:
   a multi-well plate having a plurality of wells;
   a microfluidic device;
   an inlet tube having a first end and a second end,
      wherein the first end of the inlet tube is moveable between the plurality of wells of the multi-well plate and the second end is being in a fluid communication with the microfluidic device to deliver fluid to the microfluidic device from the plurality of wells of the multi-well plate, and wherein the first end of the inlet tube is moveable relative to the microfluidic device;

an outlet tube having a first end being in fluid communication with the microfluidic device and a second end being configured to deliver fluid to a waste reservoir, the outlet tube including an outlet valve disposed between the first end and second end of the outlet tube, the outlet valve being operable to selectively permit fluid to flow through the outlet tube; and a backpressure mechanism comprising a reservoir of liquid coupled to a backpressure tube, the backpressure tube having a first end being in fluid communication with the reservoir and a second end being in fluid communication with the inlet tube, wherein the backpressure mechanism is operable to apply a back pressure to the inlet tube, wherein, as the first end of the inlet tube is being removed from the fluid in one of the plurality of wells, the outlet valve is switched to an off position preventing fluid from flowing through the outlet tube and the backpressure mechanism applies a back pressure to the inlet tube to prevent formation of bubbles in the inlet tube.

2. The system of claim 1, wherein the inlet tube is coupled to a linkage arm movable in x, y, and z directions to allow for movement of the inlet tube between the plurality of wells of the multi-well plate.

3. The system of claim 1, wherein the plurality of wells includes at least one of living biological samples and non-living biological samples.

4. The system of claim 1, wherein fluid from the microfluidic device is configured to be delivered to at least one of a devices tube, and subsequent multi-well plates during or after automated experimentation.

5. The system of claim 1, wherein the microfluidic device is in the form of several microfluidic devices in series.

6. The system of claim 1, wherein the microfluidic device is in the form of several microfluidic devices in parallel.

7. The system of claim 1, wherein at least one well of the plurality of wells in the multi-well plate is configured to be a buffer well such that the buffer well includes a fluid for cleaning the inlet tube before the inlet tube is moved to a subsequent well in the multi-well plate.

8. A system for delivering fluid to a microfluidic device, comprising:

a robotic multi-well plate holder holding a multi-well plate comprising a plurality of wells;

an inlet tube having a first end and a second end;

a micro-controller operably engaging the robotic multi-well plate holder and the inlet tube so as to enable movement of the first end of the inlet tube between the plurality of wells of the multi-well plate;

an outlet tube having a first end being in fluid communication with the microfluidic device and a second end being configured to deliver fluid to a waste reservoir, the outlet tube including an outlet valve disposed between the first end and the second end, the outlet valve being operable to selectively permit fluid to flow through the outlet tube; and a backpressure mechanism including a reservoir of liquid coupled to a backpressure tube, the backpressure tube having a first end being in fluid communication with the reservoir and a second end being in fluid communication with the microfluidic device and the inlet tube, wherein the backpressure mechanism is operable to apply a back pressure to the inlet tube, wherein the second end of the inlet tube is configured to deliver fluid to a microfluidic device from the plurality of wells of the multi-well plate, wherein the first end of the inlet tube is moveable relative to the microfluidic device, and wherein, as the first end of the inlet tube is being removed from the fluid in one of the plurality of wells, the outlet valve is switched to an off position preventing fluid from flowing through the outlet tube and the backpressure mechanism applies a back pressure to the inlet tube to prevent formation of bubbles in the inlet tube.

9. The system of claim 8, wherein further comprising a servo linkage operably engaging the first end of the inlet tube to fluid connect the first end of the inlet tube to plurality of wells of the multi-well plate.

10. The system of claim 8, wherein the plurality of wells include at least one of living biological samples and non-living biological samples.

11. The system of claim 8, wherein at least one well of the plurality of wells in the multi-well plate is configured to be a buffer well such that the buffer well includes a fluid for cleaning the inlet tube before the inlet tube is moved to a subsequent well in the multi-well plate.

12. A method for delivering fluid to a microfluidic device, comprising:

positioning a first end of an inlet tube in a first well of a multi-well plate, wherein the first well includes a first composition;

connecting a second end of the inlet tube to a microfluidic device to add the first composition to the microfluidic device;

delivering fluid from the microfluidic device through an outlet tube to a waste reservoir, the outlet tube including an outlet valve configured and arranged to selectively permit fluid to flow through the outlet tube;

moving the first end of the inlet tube to a second well of the multi-well plate to add a second composition from the second well to the microfluidic device, and wherein the first end of the inlet tube is moveable relative to the microfluidic device; and applying a backpressure to the inlet tube with a backpressure mechanism and turning the outlet valve to an off position preventing fluid from flowing through the outlet tube to prevent formation of bubbles in the inlet tube as the inlet tube is removed from a liquid in the first well;

wherein the backpressure mechanism is in fluid communication with a liquid reservoir and the inlet tube.

13. The method of claim 12, further comprising applying a contamination protocol to prevent contamination between the first and second composition as the inlet tube moves from the first well to the second well.

14. The method of claim 13, wherein the contamination protocol includes moving the first end of the inlet tube to a buffer well in the multi-well plate before the inlet tube is moved to the second well to clean the inlet tube of the first composition.

15. The system of claim 1, wherein, when the first end of the inlet tube is disposed in the fluid of a respective one of the plurality of wells, the outlet valve is in an on position allowing fluid to flow through the outlet tube and the backpressure mechanism does not apply a back pressure to the inlet tube to allow fluid to flow from the respective one of the plurality of wells through the inlet tube.

16. The system of claim 8, wherein, as the first end of the inlet tube is disposed in the fluid in a respective one of the plurality of wells, the outlet valve is in an on position allowing fluid to flow through the outlet tube and the backpressure mechanism does not apply a back pressure to the inlet tube to allow fluid to flow from the respective one of the plurality of wells through the inlet tube.

17. The method of claim 12, further comprising, after the positioning a first end of the inlet tube in a first well of a multi-well plate step, tuning on the outlet valve to an on position allowing fluid to flow through the outlet tube and turning the backpressure mechanism to an off position so that the backpressure mechanism does not apply a back pressure to the inlet tube, to allow fluid to flow from the first well through the inlet tube.

18. A system for delivering fluid to a microfluidic device, comprising:
- one or more containers;
- a microfluidic device;
- an inlet tube having a first end and a second end,
- an outlet tube having a first end being in fluid communication with the microfluidic device and a second end being configured to deliver fluid to a waste reservoir, the outlet tube including an outlet valve disposed between the first end and second end of the outlet tube, the outlet valve being operable to selectively permit fluid to flow through the outlet tube; and
- a backpressure mechanism comprising a reservoir of liquid coupled to a backpressure tube and a backpressure valve in fluid communication with the backpressure tube, the backpressure tube having a first end being in fluid communication with the reservoir and a second end being in fluid communication with the inlet tube, wherein the backpressure mechanism is operable to apply a back pressure to the inlet tube upon actuation of the backpressure valve, wherein, as the first end of the inlet tube is being removed from the fluid in one of the one or more containers, the outlet valve is switched to an off position preventing fluid from flowing through the outlet tube and the backpressure mechanism applies a back pressure to the inlet tube to prevent formation of bubbles in the inlet tube, and wherein, when the first end of the inlet tube is disposed in fluid in a respective one of the one or more containers, the outlet valve is in an on position allowing fluid to flow through the outlet tube and the backpressure valve is in an off position to prevent the backpressure mechanism from applying a back pressure to the inlet tube, to allow fluid to flow from the respective one of the one or more containers through the inlet tube.

* * * * *